United States Patent
Kato

(10) Patent No.: US 9,205,617 B2
(45) Date of Patent: Dec. 8, 2015

(54) MANUFACTURING METHOD OF CERAMIC HONEYCOMB STRUCTURE

(71) Applicant: NGK INSULATORS, LTD., Nagoya (JP)

(72) Inventor: Shigeki Kato, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 277 days.

(21) Appl. No.: 13/913,854

(22) Filed: Jun. 10, 2013

(65) Prior Publication Data

US 2014/0001683 A1  Jan. 2, 2014

(30) Foreign Application Priority Data

Jun. 27, 2012 (JP) ................... 2012-144231

(51) Int. Cl.
 B28B 11/12 (2006.01)
 B28B 17/00 (2006.01)
 C04B 38/00 (2006.01)
 B29D 99/00 (2010.01)

(52) U.S. Cl.
 CPC ............ *B29D 99/0089* (2013.01); *B28B 11/12* (2013.01); *B28B 17/0072* (2013.01)

(58) Field of Classification Search
 CPC .................................................. C04B 38/0006
 See application file for complete search history.

(56) References Cited

U.S. PATENT DOCUMENTS

| 4,877,970 A * | 10/1989 | Minamikawa et al. .. 250/559.14 |
|---|---|---|
| 5,188,779 A | 2/1993 | Horikawa et al. |
| 2002/0046925 A1 | 4/2002 | Miyakawa et al. |
| 2007/0004592 A1* | 1/2007 | Ohno et al. ............. 502/439 |
| 2009/0291032 A1* | 11/2009 | Ohno et al. ............. 422/168 |
| 2013/0049243 A1* | 2/2013 | McCauley et al. ......... 264/40.1 |
| 2014/0001665 A1* | 1/2014 | Kato ........................ 264/40.1 |
| 2014/0001683 A1* | 1/2014 | Kato ........................ 264/630 |
| 2015/0052757 A1* | 2/2015 | Okazaki ................... 29/897.15 |

FOREIGN PATENT DOCUMENTS

| JP | 03-275309 | 12/1991 |
|---|---|---|
| JP | 2002-046856 A | 2/2002 |
| JP | 2006-231475 | 9/2006 |

* cited by examiner

*Primary Examiner* — Erin Snelting
(74) *Attorney, Agent, or Firm* — Burr & Brown, PLLC

(57) ABSTRACT

A contour of an outer diameter dimension of a dried ceramic honeycomb body is measured in a first measuring portion Q1 and a second measuring portion Q2 of the surface of an outer wall of the dried ceramic honeycomb body; a total of absolute values of differences between respective values of four contours $C1x$, $C1y$, $C2x$ and $C1y$ measured at a first measurement point $P1x$ and a second measurement point $P1y$ of the first measuring portion Q1 and a third measurement point $P2x$ and a fourth measurement point $P2y$ of the second measuring portion Q2 is obtained; and one end surface and the other end surface are subjected to finishing step in a state where four measurement points of the outer wall, at which the total of the absolute values is minimum, are fixed by a first fixture and a second fixture.

19 Claims, 8 Drawing Sheets

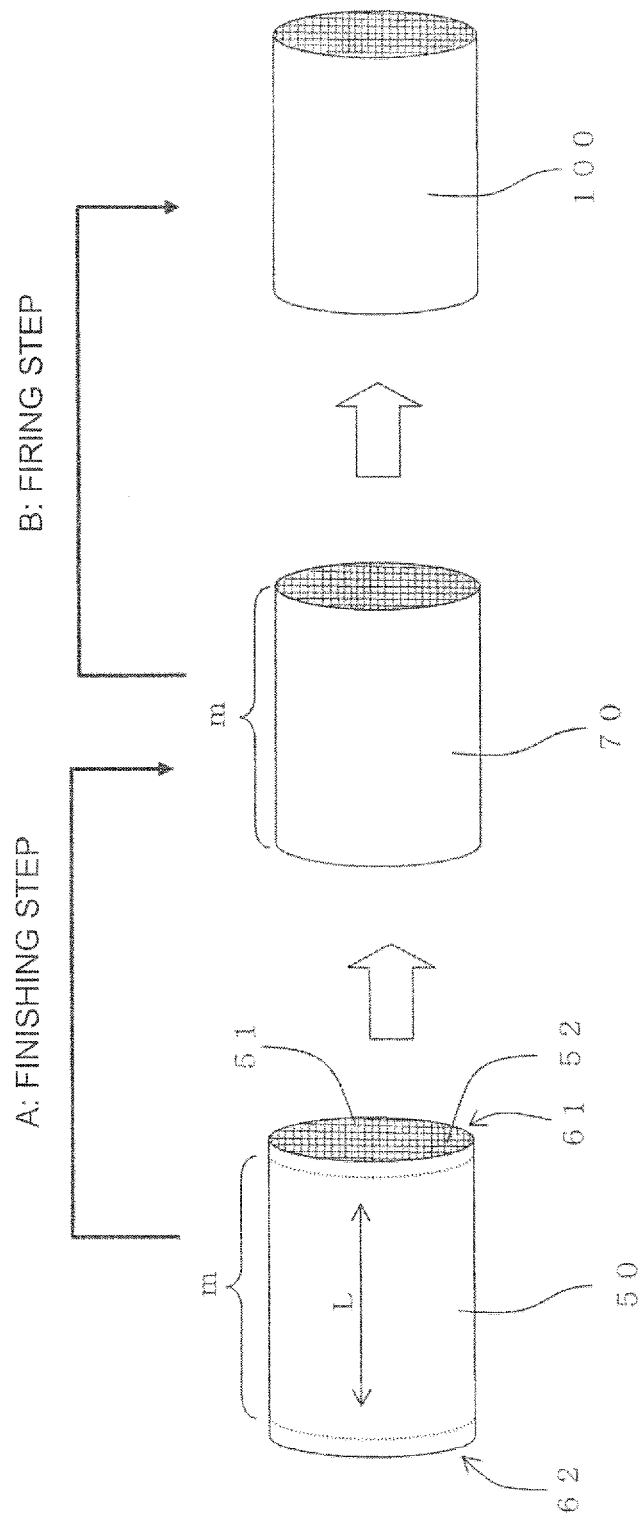

MANUFACTURING METHOD OF CERAMIC HONEYCOMB STRUCTURE

The present application is an application based on JP-2012-144231 filed on Jun. 27, 2012 with the Japanese Patent Office, the entire contents of which are incorporated herein by reference.

BACKGROUND OF THE INVENTION

1. Field of the Invention

The present invention relates to a manufacturing method of a ceramic honeycomb structure, and more particularly, it relates to a manufacturing method of a ceramic honeycomb structure which has an excellent productivity and in which it is possible to manufacture the ceramic honeycomb structure having an excellent perpendicularity irrespective of a size of an outer diameter dimension of the ceramic honeycomb structure.

2. Description of Related Art

In various fields of chemistry, electric power, iron and steel, and the like, a honeycomb structure made of a ceramic material (the ceramic honeycomb structure) is employed as a support for a catalyst device to be used in an environmental countermeasure, recovery of specific substances and the like. Moreover, the ceramic honeycomb structure is also used as a filter for purification of an exhaust gas. Such a ceramic honeycomb structure has excellent heat resistance and corrosion resistance, and is employed in various use applications as described above. The honeycomb structure is a structure having partition walls with which a plurality of cells extending from one end surface to the other end surface are formed to become through channels of a fluid.

Heretofore, the honeycomb structure having an outer diameter dimension smaller than 150 mm has been manufactured by the following method. First, a kneaded material including a forming raw material is formed into a honeycomb-like shape, to obtain a formed honeycomb body. The formed honeycomb body is a cylindrical body in which the plurality of cells extending from the one end surface to the other end surface are formed with the partition walls. This formed honeycomb body is cut so that a length of the formed honeycomb body in a cell extending direction is larger than a length of a finished dimension, and furthermore, the formed honeycomb body is dried, to obtain the dried honeycomb body. Next, a finishing step is performed so that the length of the dried honeycomb body in the cell extending direction becomes the finished dimension, to obtain the finished dried honeycomb body. Next, the finished dried honeycomb body is fired, to obtain the honeycomb structure (see, e.g., Patent Document 1). Moreover, the honeycomb structure manufactured by such a method is inspected so as to judge whether or not an outer diameter dimension of the honeycomb structure satisfies an outer diameter dimension tolerance as a reference, and the honeycomb structure which has passed the inspection is shipped as a product.

On the other hand, when the honeycomb structure having an outer diameter dimension of 150 mm or more is manufactured, a step of separately preparing an outer wall is added sometimes (see, e.g., Patent Document 2). An example of the step of separately preparing the outer wall is a step of firing the finished dried honeycomb body, grinding an outer periphery of the obtained fired body, and coating a ground outer peripheral portion with an outer periphery coat to separately prepare the outer wall. The honeycomb structure having an outer diameter dimension of 150 mm or more will be called "the large honeycomb structure" sometimes.

Hereinafter, the above example of the manufacturing method of manufacturing the honeycomb structure by drying, finishing and firing the formed honeycomb body will be called "the manufacturing method by integral forming" sometimes. Moreover, the manufacturing method to which the step of separately preparing the outer wall is added will be called "the manufacturing method by outer periphery coating" sometimes. Furthermore, as a method of finishing step of end surfaces of the honeycomb structure, there is disclosed a method of correcting a posture of the honeycomb structure to perform the finishing step in this state, or the like (see, e.g., Patent Document 3).

[Patent Document 1] JP-A-2002-046856
[Patent Document 2] JP-A-3-275309
[Patent Document 3] JP-A-2006-231475

SUMMARY OF THE INVENTION

However, in a conventional manufacturing method of a honeycomb structure, there has been the problem that sufficient perpendicularities of one end surface and the other end surface of the obtained honeycomb structure is not achieved (hereinafter "the perpendicularities of the one end surface and the other end surface" will simply be called "the perpendicularity" sometimes). Especially, in the above-mentioned manufacturing method by integral forming, the above perpendicularity remarkably deteriorates. Moreover, in recent years, an allowable range of the perpendicularity of the honeycomb structure has been strict, and enhancement of the perpendicularity of the honeycomb structure has been required. The allowable range of the perpendicularity means a range in which a reference value of the perpendicularity required for a ceramic honeycomb structure as a product is satisfied. In a processing method disclosed in, for example, Patent Document 3, a honeycomb structure is grasped by a clamp, a shape of the honeycomb structure is measured, and a posture of the honeycomb structure is corrected to perform finishing step. However, an outer wall of the honeycomb structure has a concave/convex portion and the like, and hence the above-mentioned clamp is not stable sometimes. Moreover, in the processing method disclosed in Patent Document 3, the shape measurement for correcting the posture of the honeycomb structure is performed at four points of 0°, 45°, 90° and 135° in a circumferential direction, which causes the problem that the measurement points are coarsely disposed to deteriorate precision of the processing.

Furthermore, the manufacturing method by the outer periphery coating has the problem that a manufacturing process is laborious. For example, a large honeycomb structure is manufactured mainly by using the outer periphery coating manufacturing method, because distortion or the like of a formed body noticeably occurs. However, from the viewpoint of decrease of manufacturing cost or the like, it has been considered that the large honeycomb structure is manufactured by the integral forming manufacturing method. However, when the large honeycomb structure is manufactured by the integral forming manufacturing method, the perpendicularity of the honeycomb structure more remarkably deteriorates. For example, when the large honeycomb structure is manufactured by a conventional integral forming manufacturing method, a perpendicularity yield is below 50% sometimes. In consequence, heretofore it has been considered to be remarkably difficult that the large honeycomb structure is manufactured by the integral forming manufacturing method.

The present invention has been developed in view of the above-mentioned problem, and according to the present invention, there is provided a manufacturing method of a ceramic honeycomb structure which has an excellent productivity and in which it is possible to manufacture the ceramic honeycomb structure having an excellent perpendicularity irrespective of a size of an outer diameter dimension of the ceramic honeycomb structure.

According to the present invention, there is provided a manufacturing method of a ceramic honeycomb structure as follows.

According to one aspect of the present invention, a manufacturing method of a ceramic honeycomb structure including a finishing step of finishing one end surface and the other end surface of a cylindrical dried ceramic honeycomb body having the one end surface and the other end surface, to obtain a finished dried ceramic honeycomb body is provided; and a firing step of firing the finished dried ceramic honeycomb body, to obtain the ceramic honeycomb structure, wherein in the finishing step, two positions away from each other in a direction from the one end surface toward the other end surface of a peripheral surface of the dried ceramic honeycomb body are a contour measurement start point P1 and a contour measurement start point P2; in a first measuring portion Q1 disposed around a periphery in a circumferential direction including the contour measurement start point P1, a contour of an outer diameter dimension of the dried ceramic honeycomb body is measured at a plurality of measurement points while shifting a measurement position from the contour measurement start point P1 in the circumferential direction; in a second measuring portion Q2 disposed around the periphery in a circumferential direction including the contour measurement start point P2, the contour of the outer diameter dimension of the dried ceramic honeycomb body is measured at a plurality of measurement points while shifting a measurement position from the contour measurement start point P2 in the circumferential direction; the contour measured at a first measurement point P1$x$ of the first measuring portion Q1 is a contour C1$x$, the contour measured at a second measurement point P1$y$ present at a position shifted by a predetermined phase from the first measurement point P1$x$ of the first measuring portion Q1 is a contour C1$y$, the contour measured at a third measurement point P2$x$ of the second measuring portion Q2 which is present at a position of the same phase as the first measurement point P1$x$ is a contour C2$x$, and the contour measured at a fourth measurement point P2$y$ of the second measuring portion Q2 which is present at a position of the same phase as the second measurement point P1$y$ is a contour C2$y$; a total of absolute values of differences between respective values of the four contours C1$x$, C1$y$, C2$x$, and C2$y$ is obtained for every measurement point; and the one end surface and the other end surface of the dried ceramic honeycomb body are subjected to the finishing step in a state where the four measurement points where the total of the absolute values of the differences between the respective values of the contours C1$x$, C1$y$, C2$x$, and C2$y$ of the peripheral surface of the dried ceramic honeycomb body is minimum are fixed by a first fixture and a second fixture.

According to a second aspect of the present invention, the manufacturing method of the ceramic honeycomb structure according to the above first aspect is provided, wherein the total of the absolute values of the differences between the respective values of the contours C1$x$, C1$y$, C2$x$ and C2$y$ is calculated in accordance with the following equation (1):

[Equation 1]

$$|C1x-C2x|+|C1y-C2y|+|C1x-C1y|+|C2x-C2y| \quad (1).$$

According to a third aspect of the present invention, the manufacturing method of the ceramic honeycomb structure according to the above first or second aspects is provided, wherein when a phase between the contour measurement start point P1 and the second measurement point P1$y$ in the four measurement points where the total of the absolute values of the differences between the respective values of the contours C1$x$, C1$y$, C2$x$, and C2$y$ is minimum is set to an optimum chuck angle, the dried ceramic honeycomb body is rotated by the optimum chuck angle prior to fixing the dried ceramic honeycomb body by the first fixture and the second fixture.

According to a fourth aspect of the present invention, the manufacturing method of the ceramic honeycomb structure according to any one of the above first to third aspects is provided, wherein the first measurement point P1$x$ and the second measurement point P1$y$ are positions shifted by 60 to 120° in the circumferential direction.

According to a fifth aspect of the present invention, the manufacturing method of the ceramic honeycomb structure according to any one of the above first to fourth aspects is provided, wherein the dried ceramic honeycomb body is mounted on a measurement table so that the one end surface becomes a bottom surface, to measure the contour.

According to a sixth aspect of the present invention the manufacturing method of the ceramic honeycomb structure according to the above fifth aspect is provided, wherein when a phase between the contour measurement start point P1 and the second measurement point P1$y$ in the four measurement points where the total of the absolute values of the differences between the respective values of the contours C1$x$, C1$y$, C2$x$, and C2$y$ is minimum is set to an optimum chuck angle, the measurement table is rotated by the optimum chuck angle prior to fixing the dried ceramic honeycomb body by the first fixture and the second fixture.

According to a seventh aspect of the present invention, the manufacturing method of the ceramic honeycomb structure according to the above fifth or sixth aspects is provided, wherein spacers are arranged in at least three portions between the dried ceramic honeycomb body and the measurement table.

According to an eighth aspect of the present invention, the manufacturing method of the ceramic honeycomb structure according to any one of the above fifth to seventh aspects is provided, wherein when the dried ceramic honeycomb body is mounted on the measurement table, a height difference of a tilt of the bottom surface of the dried ceramic honeycomb body to a horizontal plane is 4 mm or less.

According to a ninth aspect of the present invention, the manufacturing method of the ceramic honeycomb structure according to any one of the above first to eight aspects is provided, wherein a temperature of the dried ceramic honeycomb body is from 20 to 150° C.

According to a tenth aspect of the present invention, the manufacturing method of the ceramic honeycomb structure according to any one of the above first to ninth aspects is provided, wherein the contour is measured by a reflective type non-contact laser displacement meter.

According to an eleventh aspect of the present invention, the manufacturing method of the ceramic honeycomb structure according to any one of the above first to tenth aspects is provided, wherein the dried ceramic honeycomb body has a concave/convex surface on an outer periphery.

According to a twelfth aspect of the present invention, the manufacturing method of the ceramic honeycomb structure according to any one of the above first to eleventh aspects is provided, wherein a one-side tolerance of a diameter of the dried ceramic honeycomb body is larger than a perpendicularity.

According to a thirteenth aspect of the present invention, the manufacturing method of the ceramic honeycomb structure according to any one of the above first to twelfth aspects is provided, wherein the diametrical dimension of the dried ceramic honeycomb body is 100 mm or more.

According to a fourteenth aspect of the present invention, the manufacturing method of the ceramic honeycomb structure according to any one of the above first to thirteenth aspects is provided, wherein the dried ceramic honeycomb body is made of a forming raw material including at least one selected from the group consisting of cordierite, silicon carbide, and alumina.

According to a fifteenth aspect of the present invention, the manufacturing method of the ceramic honeycomb structure according to any one of the above first to fourteenth aspects is provided, further comprising a plugged portion preparing step of filling a plugging material into cells of the finished dried ceramic honeycomb body or the ceramic honeycomb structure.

According to a manufacturing method of a ceramic honeycomb structure of the present invention, it is possible to manufacture the ceramic honeycomb structure having an excellent perpendicularity irrespective of a size of a diametrical dimension of the ceramic honeycomb structure. Moreover, a laborious step in the above-mentioned manufacturing method by outer periphery coating does not need to be performed, and hence an excellent productivity is also achieved.

BRIEF DESCRIPTION OF THE DRAWINGS

FIG. 1 is a perspective view schematically showing a process to form a ceramic honeycomb structure in one embodiment of a manufacturing method of the ceramic honeycomb structure of the present invention;

DETAILED DESCRIPTION OF THE INVENTION

Figure 2A:
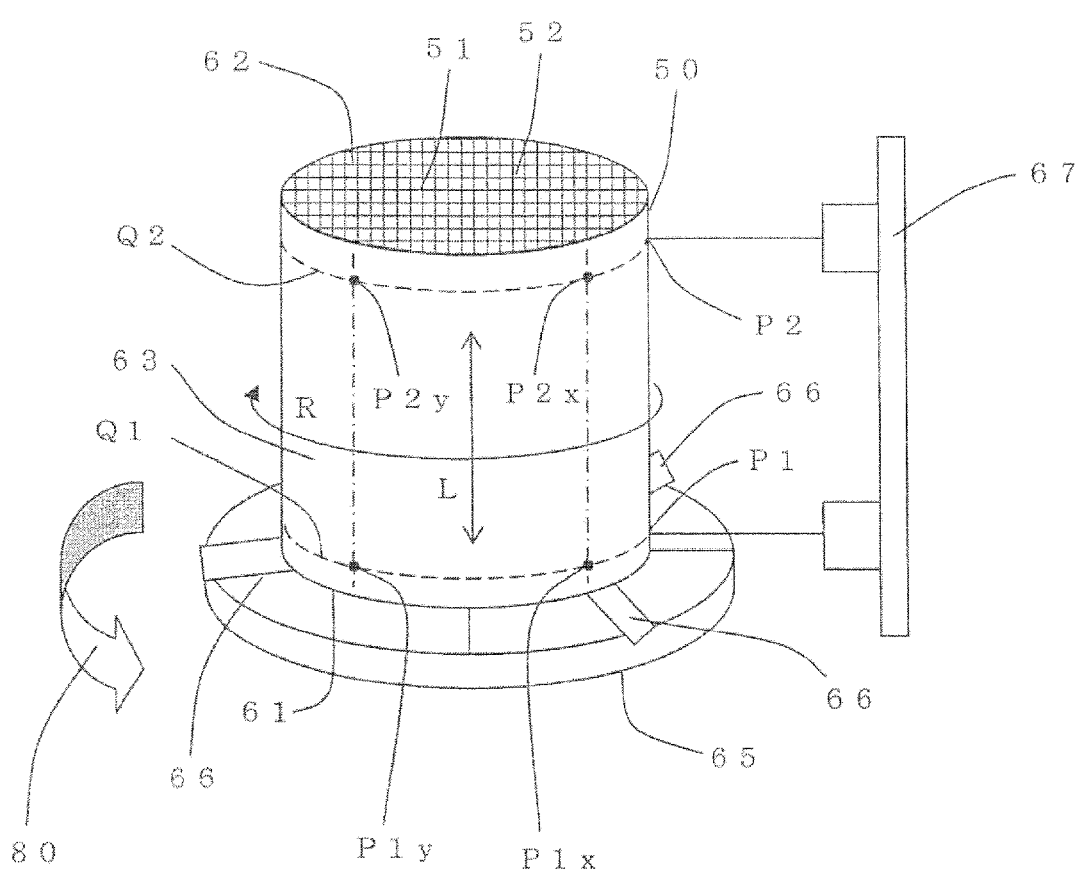
FIG. 2A is a perspective view schematically showing an example of a measuring method of a contour in a finishing step.

Next, a mode for carrying out the present invention will be described in detail with reference to the drawings. It should be understood that the present invention is not limited to the following embodiment and that design change, improvement and the like are suitably added on the basis of ordinary knowledge of a person skilled in the art without departing from the gist of the present invention.

(1) Manufacturing Method of Ceramic Honeycomb Structure:

One embodiment of a manufacturing method of a ceramic honeycomb structure of the present invention includes a finishing step A and a firing step B as shown in FIG. 1. FIG. 1 is a perspective view schematically showing a process to form the ceramic honeycomb structure in the one embodiment of the manufacturing method of the ceramic honeycomb structure of the present invention. The finishing step A is a step of finishing one end surface 61 and the other end surface 62 of a cylindrical dried ceramic honeycomb body 50 having the one end surface 61 and the other end surface 62, to obtain a finished dried ceramic honeycomb body 70. The dried ceramic honeycomb body 50 is the cylindrical body in which a plurality of cells 52 extending from the one end surface 61 to the other end surface 62 are formed with partition walls 51. The firing step B is a step of firing the finished dried ceramic honeycomb body 70 obtained in the finishing step A, to obtain a ceramic honeycomb structure 100. Hereinafter, the dried ceramic honeycomb body 50 will simply be called "the dried honeycomb body 50" sometimes. The finished dried honeycomb body 70 will simply be called "the finished dried honeycomb body 70" sometimes. The ceramic honeycomb structure 100 will simply be called "the honeycomb structure 100".

According to the manufacturing method of the ceramic honeycomb structure of the present embodiment, the finishing step A is performed by the following method. Here, FIG. 2A is a perspective view schematically showing an example of a measuring method of a contour in the finishing step.

In the manufacturing method of the ceramic honeycomb structure of the present embodiment, as shown in FIG. 2A, the contour of a diametrical dimension of the dried ceramic honeycomb body 50 is measured. Specifically, first, two positions away from each other in a direction from the one end surface 61 toward the other end surface 62 of the surface of an outer wall 63 of the dried ceramic honeycomb body 50 are a contour measurement start point P1 and a contour measurement start point P2. The two points of the contour measurement start point P1 and the contour measurement start point P2 are reference points of the measurement of the contour. The contour is measured at a plurality of measurement points while shifting a measurement position from each of the respective contour measurement start points P1 and P2 in a circumferential direction, around the whole circumferences including the contour measurement start points P1 and P2 in the respective circumferential directions. That is, in a first measuring portion Q1 disposed around a periphery including the contour measurement start point P1 in a circumferential direction R, the contour of the diametrical dimension of the dried ceramic honeycomb body 50 is measured at a plurality of measurement points while shifting the measurement position from the contour measurement start point P1 in the circumferential direction R. Moreover, in a second measuring portion Q2 disposed around a periphery including the contour measurement start point P2 in the circumferential direction R, the contour of the diametrical dimension of the dried ceramic honeycomb body 50 is measured at a plurality of measurement points while shifting the measurement position from the contour measurement start point P2 in the circumferential direction R. In a cross section of the dried ceramic honeycomb body 50 which is substantially perpendicular to a direction from the one end surface 61 toward the other end surface 62, "the circumferential direction R" is a direction of a peripheral edge of "the cross section" along the surface of the outer wall 63 of the dried ceramic honeycomb body 50 around a periphery. FIG. 2A shows an example where the dried ceramic honeycomb body 50 is mounted on a measurement table 65 on which an object to be measured can horizontally be mounted, to measure the contour. Moreover, in FIG. 2A, the dried ceramic honeycomb body 50 mounted on the measurement table 65 is rotated in a rotating direction 80, to measure the contour.

Figure 3:
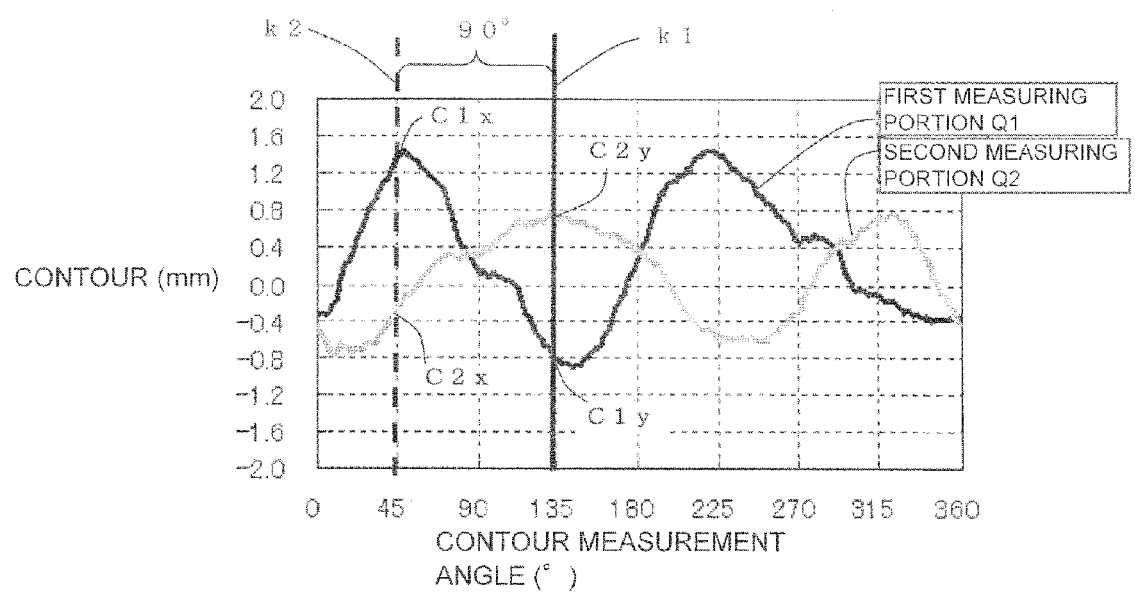
FIG. 3 is a graph showing an example of a result obtained by measuring the contour, to explain a calculating method of a total value of absolute values.

From the measurement result (see, e.g., FIG. 3) of the contour measured in this manner, there are determined support positions of a first fixture and a second fixture on which the dried ceramic honeycomb body is mounted in the finishing step. Here, FIG. 3 is a graph showing an example of the result obtained by measuring the contour, to explain a calculating method of a total value of absolute values. Specifically, the total of the absolute values of differences between respective values of "four contours $C1x$, $C1y$, $C2x$, and $C2y$" is obtained as follows.

"The contour $C1x$" is the contour measured at a first measurement point $P1x$ of the first measuring portion Q1. Moreover, "the contour $C1y$" is the contour measured at "a second measurement point $P1y$ present at a position shifted by a predetermined phase from the first measurement point $P1x$" of the first measuring portion Q1. On the other hand, "the contour $C2x$" is the contour measured at "a third measurement point $P2x$" of the second measuring portion Q2 "which is present at a position of the same phase as the first measurement point $P1x$". Moreover, "the contour $C2y$" is the contour measured at "a fourth measurement point $P2y$" of the second measuring portion Q2 "which is present at a position of the same phase as the second measurement point $P1y$".

Figure 2B:
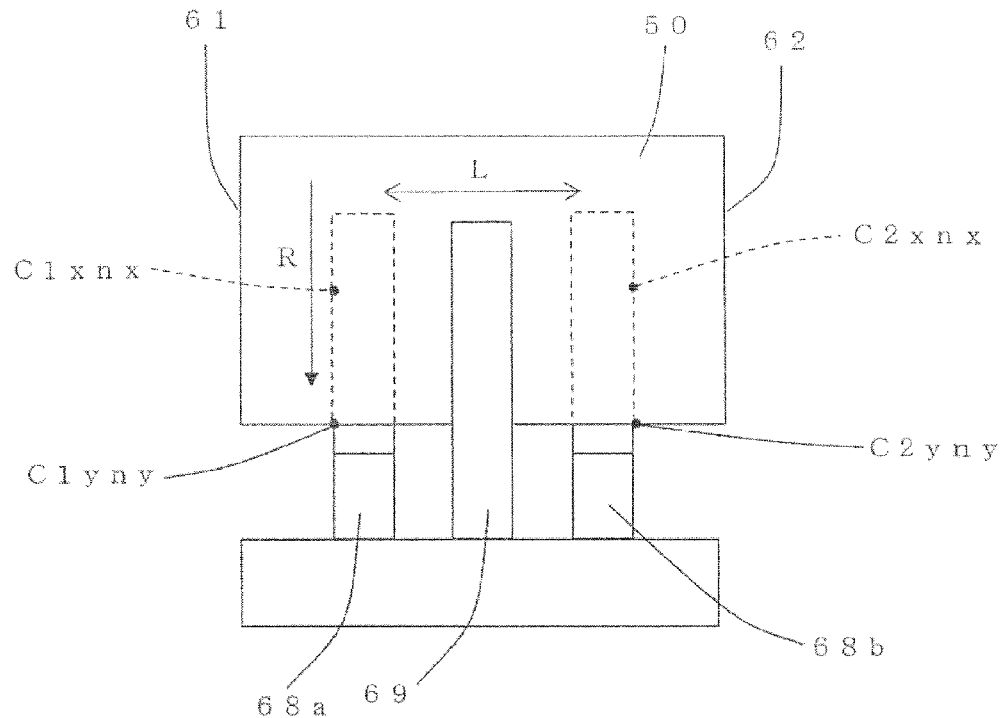
FIG. 2B is a side view schematically showing that a dried ceramic honeycomb body is mounted on a first fixture and a second fixture.
Figure 2C:
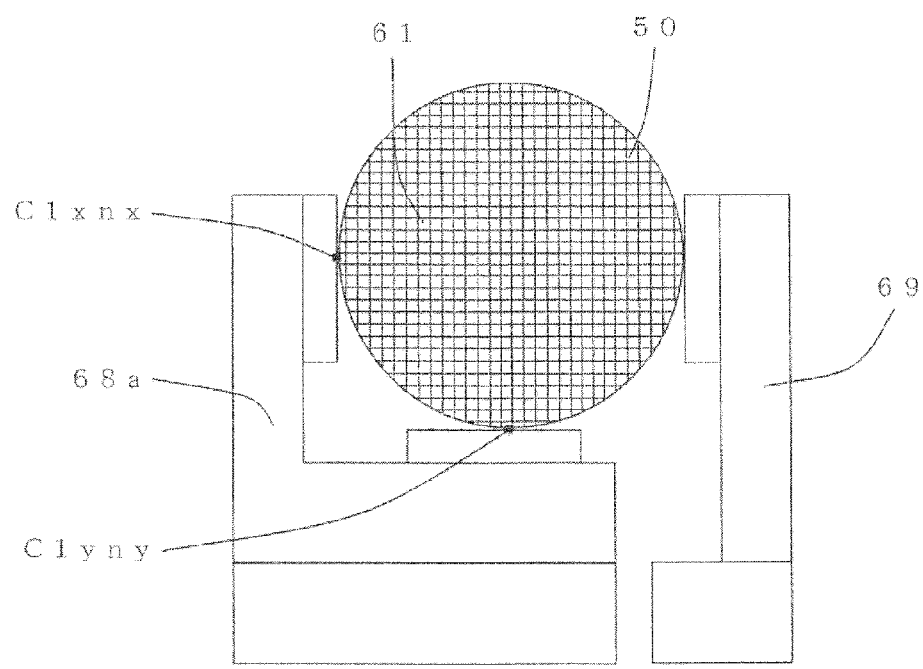
FIG. 2C is a plan view of the dried ceramic honeycomb body seen from one end surface side shown in FIG. 2B.
Figure 2D:
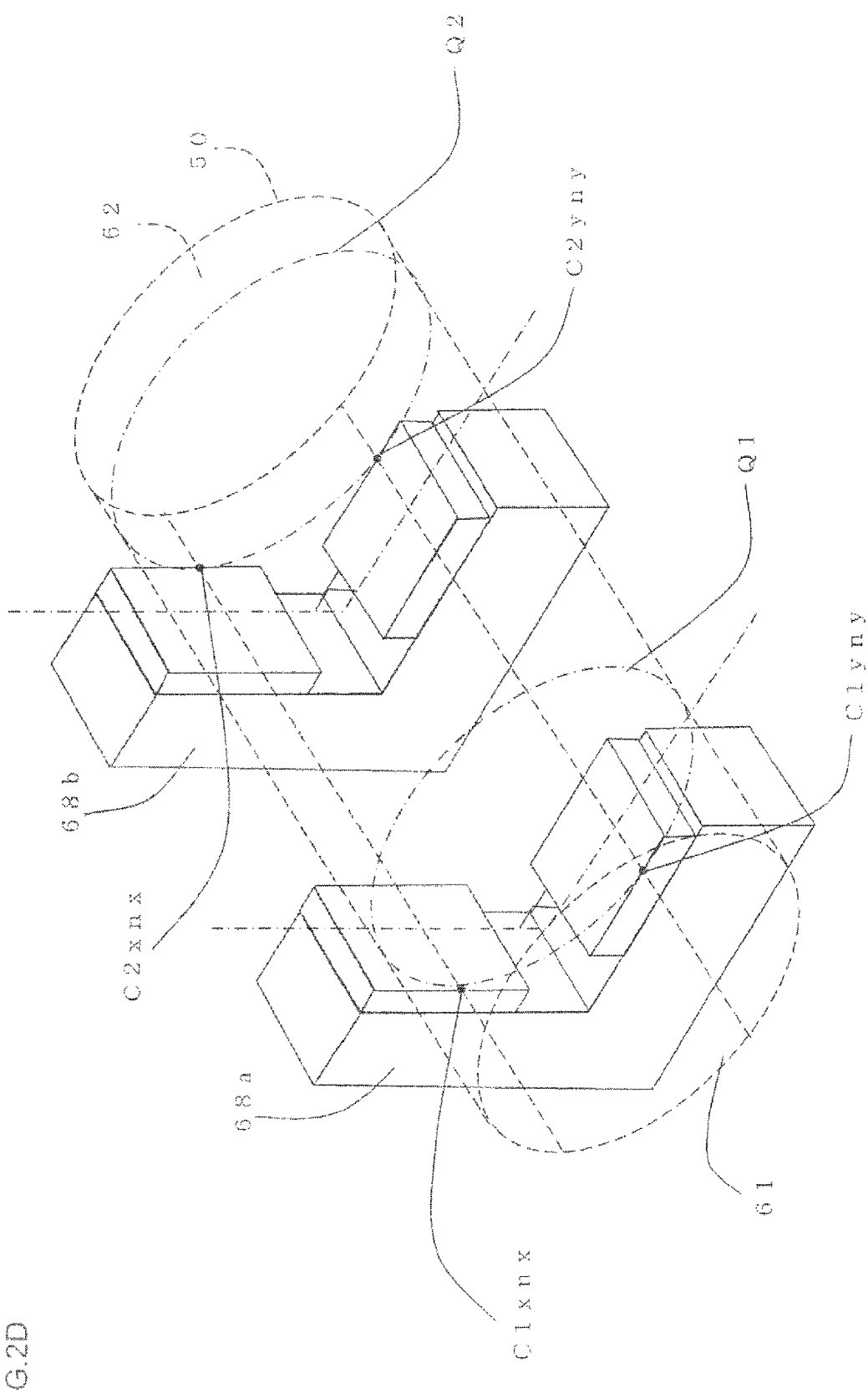
FIG. 2D is a perspective view schematically showing the first fixture and the second fixture shown in FIG. 2B.

As seen from the measurement result shown in FIG. 3, an outer peripheral shape of the dried ceramic honeycomb body 50 is deformed, or bent in the direction from the one end surface 61 toward the other end surface 62 sometimes. When such a dried ceramic honeycomb body 50 is mounted on a first fixture 68a and a second fixture 68b as shown in FIG. 2C and FIG. 2D, the dried ceramic honeycomb body 50 is considered to move from the first fixture 68a and the second fixture 68b. That is, when the outer peripheral shape of the dried ceramic honeycomb body 50 is deformed, the dried ceramic honeycomb body cannot be mounted on the first fixture 68a and the second fixture 68b in a stable state. Therefore, when the dried ceramic honeycomb body 50 is mounted on the first fixture 68a and the second fixture 68b and then fixed to an auxiliary fixture 69, the dried ceramic honeycomb body 50 moves to tilt sometimes. When the tilted cried ceramic honeycomb body 50 is cut, a perpendicularity of the finished dried ceramic honeycomb body deteriorates. In the manufacturing method of the ceramic honeycomb structure of the present embodiment, the positions to be fixed by the first fixture 68a and the second fixture 68b are determined from the above-mentioned contour measurement result, to perform the finishing step. It is to be noted that when the dried ceramic honeycomb body 50 is mounted on the first fixture 68a and the second fixture 68b, a point on the first measuring portion Q1 of the dried ceramic honeycomb body 50 is fixed by an end of the first fixture 68a on a side provided with a cutting tool 75a. Then, a point of the second measuring portion Q2 of the dried ceramic honeycomb body 50 is fixed by an end of the second fixture 68b on a side provided with a cutting tool 75b. Consequently, in the manufacturing method of the ceramic honeycomb structure of the present embodiment, "the position to be fixed by the end of the first fixture 68a on the side provided with the cutting tool 75a" in a direction L from the one end surface 61 toward the other end surface 62 of the dried ceramic honeycomb body 50 is present in the first measuring portion Q1. Similarly, "the position to be fixed by the end of the second fixture 68b on the side provided with the cutting tool 75b" in the direction L from the one end surface 61 toward the other end surface 62 of the dried ceramic honeycomb body 50 is present in "the second measuring portion Q2". According to such a constitution, the dried ceramic honeycomb body 50 is mounted on the first fixture 68a and the second fixture 68b at the position where "the total of the absolute values of the contours" is minimum. Furthermore, the dried ceramic honeycomb body is mounted on the cutting tool 75a side of the first fixture 68a and the cutting tool 75b side of the second fixture 68b, and hence the perpendicularity further enhances. A distance n1 or n2 between each of the first fixture 68a and the second fixture 68b and each cutting tool is preferably minimum in a region where the cutting tool does not interfere with the fixture, and is specifically preferably 10 mm or less.

The above-mentioned "total of the absolute values of the differences between the respective values of the contours $C1x$, $C1y$, $C2x$ and $C2y$" is calculated in accordance with the following equation (1). Hereinafter, "the total of the absolute values of the differences between the respective values of the contours $C1x$, $C1y$, $C2x$, and $C2y$" will simply be called "the total of the absolute values of the contours" sometimes. The calculation of the total of the absolute values of the differences between the respective contours is performed in accordance with all the measured contours.

$$|C1x-C2x|+|C1y-C2y|+|C1x-C1y|+|C2x-C2y| \quad (1).$$

Next, "the totals of the absolute values of the differences between the respective contours" calculated at the respective measurement points are compared, to find the position where "the total of the absolute values of the differences between the respective contours" is minimum.

Next, as shown in FIG. 2B to FIG. 2E, the four measurement points at which the total of the absolute values of the differences between the respective values of the contours of the surface of the outer wall 63 of the dried ceramic honeycomb body 50 are fixed by the first fixture 68a and the second fixture 68b. Moreover, in a state where the dried ceramic honeycomb body 50 is fixed by the first fixture 68a and the second fixture 68b, the one end surface 61 and the other end surface 62 of the dried ceramic honeycomb body 50 are subjected to the finishing step. In FIG. 2B to FIG. 2E, the four measurement points at which the total of the absolute values of the differences between the respective values of the contours is minimum are fixed at support positions $C1xnx$ and $C1yny$ of the first fixture 68a and support positions $C2xnx$ and $C2yny$ of the second fixture 68b.

The first fixture 68a and the second fixture 68b fix the lateral dried ceramic honeycomb body 50 so that the direction L from the one end surface 61 toward the other end surface 62 of the dried ceramic honeycomb body 50 is substantially parallel to a horizontal direction. That the first fix position ($C1yny$) of the lowermost point in a vertical direction of the first fixture 68a fixes "the second measurement point $P1y$ at which the contour $C1y$ is measured in the four measurement points at which "the total of the absolute values of the differences between the respective contours" is minimum". Moreover, the second fix position ($C1xnx$) shifted by a predetermined phase in the circumferential direction from the first fix position of the lowermost point in the vertical direction of the first fixture 68a fixes "the first measurement point $P1x$ at which the contour. $C1x$ is measured in the four measurement points at which "the total of the absolute values of the differences between the respective contours" is minimum". Similarly, the third fixes position ($C2yny$) of the lowermost point in the vertical direction of the second fixture 68b supports "the fourth measurement point $P2y$ at which the contour $C2y$ is measured in the four measurement points at which "the total of the absolute values of the differences between the respective contours" is minimum". Moreover, the fourth fix position (C2xnx) shifted by a predetermined phase in the circumferential direction from the third fix position of the lowermost point in the vertical direction of the second fixture 68b fixes "the third measurement point P2x at which the contour C2x is measured in the four measurement points at which "the total of the absolute values of the differences between the respective contours" is minimum". It is to be noted that in "the first fix position C1yny", "C1y" indicates the value of the contour, and "ny" indicates a contour measurement angle. In "the second fix position C1xnx", "C1x" indicates the value of the contour, and "nx" indicates a contour measurement angle. In "the third fix position C2yny", "C2y" indicates the value of the contour, and "ny" indicates a contour measurement angle. In "the fourth fix position C2xnx", "C2x" indicates the value of the contour, and "nx" indicates a contour measurement angle. The contour measurement angle is an angle at the measurement point of each contour, when the contour measurement start point (P1 or P2) is 0° and the measurement around the side surface of the dried ceramic honeycomb body is set to 360°.

Here, a phase between the two fix positions (the first fix position and the second fix position) of the first fixture 68a is called "a fixing angle" of the first fixture 68a sometimes. That is, when a phase between the first measurement point P1x and the second measurement point P1y is 90°, the fixing angle of the first fixture 68a is 90°. In FIG. 2B to FIG. 2D, a shape of each of the first fixture 68a and the second fixture 68b is an L-shape having such a constitution as to fix two points, i.e., the position of the lowermost point in the vertical direction and the position away by 90° from the above position in the circumferential direction, in the outer wall 63 of the dried ceramic honeycomb body 50 which is laterally disposed. Therefore, when "the total of the absolute values of the differences between the respective values of the contours" is calculated, the phase between the first measurement point and the second measurement point is also 90°. Moreover, in FIG. 2B to FIG. 2D, the dried ceramic honeycomb body 50 is fixed by the first fixture 68a and the second fixture 68b, and the auxiliary fixture 69. The auxiliary fixture 69 fixes the outer wall on a side opposite to the position away by 90° in the above circumferential direction via the center, in the cross section of the dried ceramic honeycomb body 50 which is perpendicular to the direction L from the one end surface 61 toward the other end surface 62 of the dried ceramic honeycomb body 50. The auxiliary fixture 69 can prevent rolling of the dried ceramic honeycomb body 50.

Figure 2E:
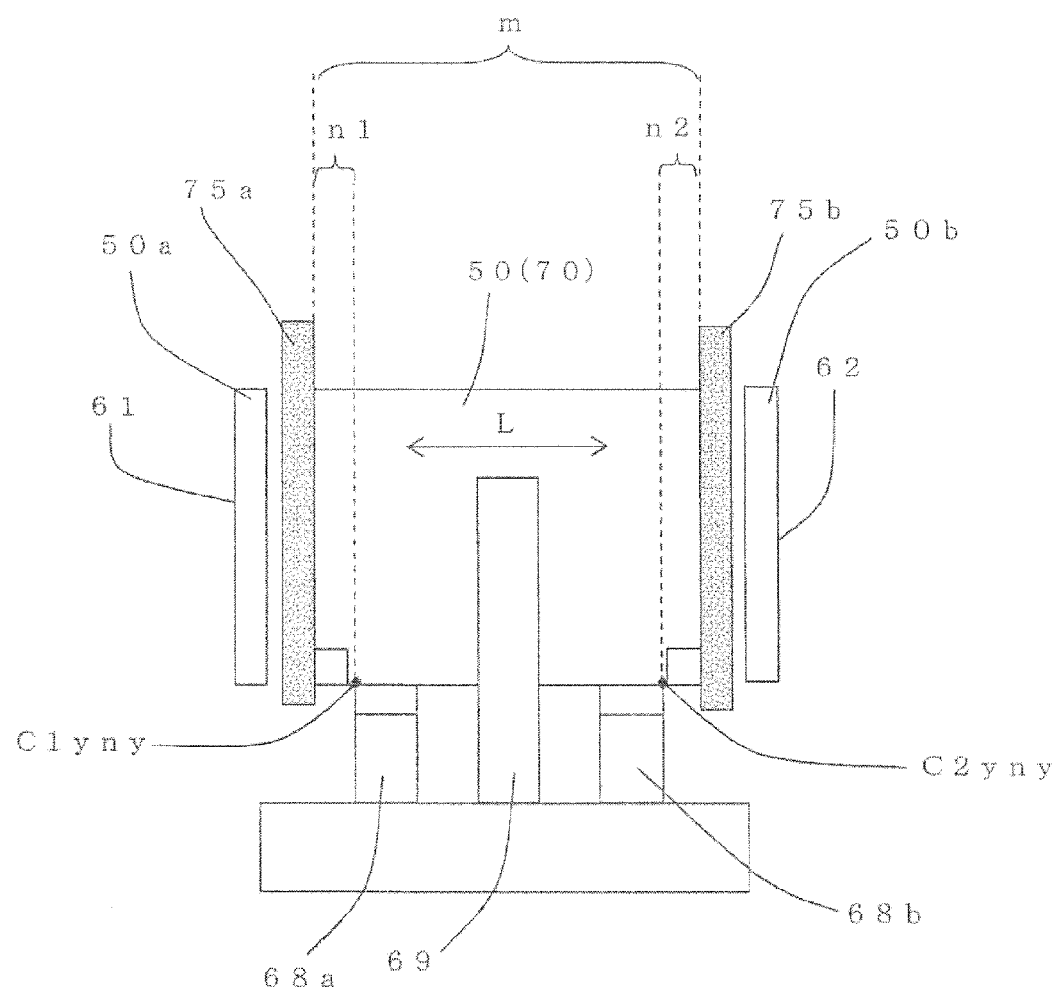
FIG. 2E is a side view schematically showing an example of finishing step in the finishing step.

Next, as shown in FIG. 2E, the one end surface 61 and the other end surface 62 of the dried ceramic honeycomb body 50 are subjected to the finishing step. FIG. 2E shows an example where the one end surface 61 and the other end surface 62 of the dried ceramic honeycomb body 50 are subjected to the finishing step by the cutting tools 75a and 75b. An example of each of the cutting tools 75a and 75b is a grindstone.

The finishing step is performed so as to set, to a finished dimension m, the length of the dried ceramic honeycomb body 50 in the direction L from the one end surface 61 toward the other end surface 62. That is, the finishing step is a step of cutting surplus portions 50a and 50b from the finished dimension m of the dried ceramic honeycomb body 50 including the one end surface 61 and the other end surface 62.

As a distance n1 from the cutting tool 75a to the first fix position C1yny of the first fixture 68a and a distance n2 from the cutting tool 75b to the third fix position C2yny of the second fixture 68b decrease, the perpendicularity of the obtained finished dried ceramic honeycomb body 70 enhances. However, blade edges of the cutting tools 75a and 75b vibrate sometimes by vibrations of the cutting tools 75a and 75b. Therefore, as each of the above-mentioned distances n1 and n2, it is preferable to acquire such a length that the first fixture 68a and the second fixture 68b do not come in contact with the blade edges of the cutting tools 75a and 75b. Each of the distances n1 and n2 is preferably 10 mm or less.

In a conventional manufacturing method of a ceramic honeycomb structure, end surfaces of a dried ceramic honeycomb body have only been cut, to adjust a length of the dried ceramic honeycomb body to a uniform length by this cut processing. However, a contour of the dried ceramic honeycomb body is not constant in a circumferential direction of the dried ceramic honeycomb body. Moreover, the contour of each dried ceramic honeycomb body is not constant either. Therefore, when the length of the dried ceramic honeycomb body is only adjusted to the uniform length by the cut processing as in the conventional manufacturing method, it has remarkably been difficult to manufacture the ceramic honeycomb structure having an excellent perpendicularity with high frequency.

Here, when four points which are noticeably different from one another in the value of the contour of the dried ceramic honeycomb body 50 are fix points of the first fixture 68a and the second fixture 68b, the following state is achieved. That is, the dried ceramic honeycomb body 50 is fixed in a tilted state to the first fixture 68a and the second fixture 68b. When the end surfaces of the dried ceramic honeycomb body 50 having such a state are subjected to the finishing step, the perpendicularity of the dried ceramic honeycomb body 50 extremely deteriorates. Moreover, the value of the contour of the dried ceramic honeycomb body varies for every dried ceramic honeycomb body. Therefore, it has been considered remarkably difficult to subject, all the dried ceramic honeycomb bodies to be manufactured to the finishing step so that the perpendicularity becomes suitable. In the conventional manufacturing method, after manufacturing the ceramic honeycomb structure, the perpendicularity and the like are inspected, and ceramic honeycomb structures which do not satisfy a reference value have been subjected to a treatment such as discarding.

In the manufacturing method of the ceramic honeycomb structure of the present embodiment, the finishing step is performed in a state where the four measurement points, at which "the total of the absolute values of the differences between the respective values of the contours" is minimum, are fixed by the first fixture and the second fixture. Therefore, it is possible to manufacture the ceramic honeycomb structure having an excellent perpendicularity. In particular, it is possible to manufacture the ceramic honeycomb structure having the excellent perpendicularity irrespective of the size of the diametrical dimension of the ceramic honeycomb structure. That is, in the manufacturing method of the ceramic honeycomb structure of the present embodiment, each dried ceramic honeycomb body is subjected to the finishing step so as to achieve the best perpendicularity. Therefore, even the ceramic honeycomb structure having a large diametrical dimension has excellent perpendicularity. In a large ceramic honeycomb structure, the contour of the dried ceramic honeycomb body noticeably fluctuates. Therefore, when the finishing step is performed as in the conventional manufacturing method, the perpendicularity remarkably deteriorates sometimes. Furthermore, in the manufacturing method of the ceramic honeycomb structure of the present embodiment, it is not necessary to perform a laborious step of a manufacturing method by outer periphery coating, and hence the manufacturing method also has an excellent productivity.

"The contour" means a size of an actual contour shift from a geometric contour determined by a theoretically correct dimension. Therefore, the contour measured in the manufacturing method of the ceramic honeycomb structure of the present embodiment shown in FIG. 3 is the size of the shift of the dried ceramic honeycomb body from a reference diametrical dimension (corresponding to "0" of the ordinate of FIG. 3). By measuring such a contour, a fluctuation of a line element constituting a curved surface can be regulated in a two-dimensional planar tolerance region. That is, the fluctuation of the line element constituting an outer peripheral surface of the dried ceramic honeycomb body can be regulated by the two-dimensional planar tolerance region.

Figure 5:
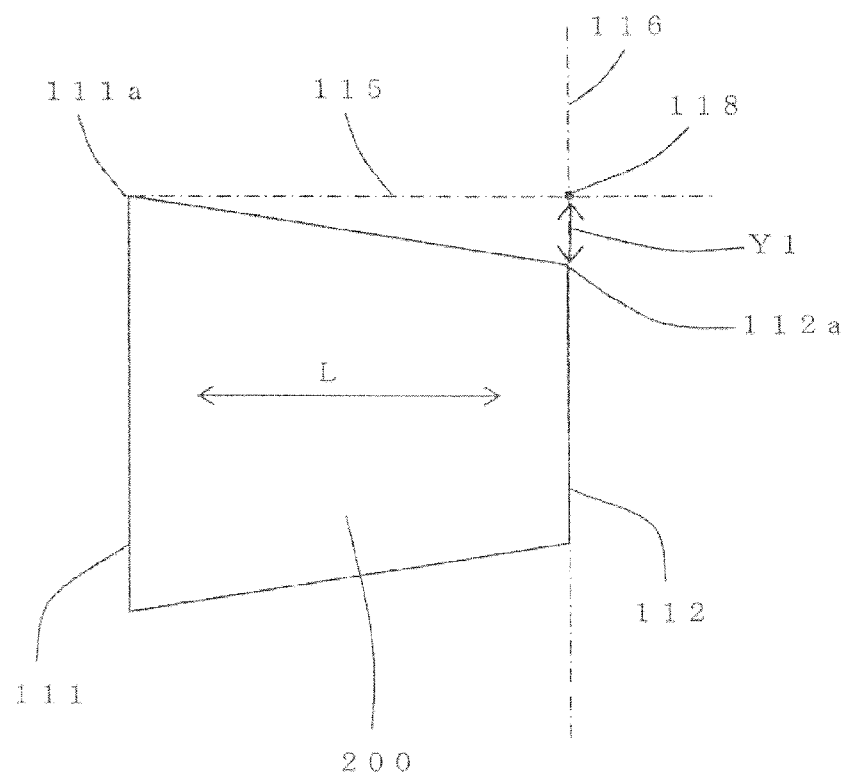
FIG. 5 is a schematic view for explaining a perpendicularity, and a side view of a ceramic honeycomb structure seen from a side surface thereof.

"The perpendicularity" will be described with reference to FIG. 5 as an example. FIG. 5 is a schematic view for explaining the perpendicularity, and a side view of a ceramic honeycomb structure 200 seen from a side surface thereof. When a perpendicularity of the ceramic honeycomb structure 200 is obtained, first, a virtual line 115 perpendicular to one end surface 111 is drawn from one arbitrary point 111a of a peripheral edge of the one end surface 111 of the ceramic honeycomb structure 200. An intersection 118 between the virtual line 115 and a virtual plane 116 of the other end surface 112 is obtained. Then, there is obtained a length Y1 which connects the intersection 118 to an end point 112a of the peripheral edge of the other end surface 112. The above "length Y1" is the perpendicularity of the one arbitrary point. As to the perpendicularity of the ceramic honeycomb structure 200, a maximum value obtained by measuring "the length Y1" around the whole circumference is the perpendicularity.

"The finished dimension of the dried ceramic honeycomb body" is a length from the one end surface to the other end surface which is required for the finished dried ceramic honeycomb body. The length from the one end surface to the other end surface which is required for the finished dried ceramic honeycomb body is suitably determined from a standard length from the one end surface to the other end surface of the ceramic honeycomb structure as a final product in consideration of a contraction amount or the like at firing.

Hereinafter, the manufacturing method of the ceramic honeycomb structure of the present embodiment will be described in more detail.

(1-1) Preparation of Dried Ceramic Honeycomb Body:

First, there will be described a preparing method of the dried ceramic honeycomb body which is to be used in the manufacturing method of the ceramic honeycomb structure of the present embodiment. The preparing method of the dried ceramic honeycomb body is not limited to the following preparing method. That is, there is not any special restriction on the preparing method or the like of the dried ceramic honeycomb body, prior to the finishing step to be performed so that the length in the direction from the one end surface toward the other end surface becomes the finished dimension.

As the preparing method of the dried ceramic honeycomb body, a usual extrusion-forming method is used. An example of the method is an intermittent forming (ram forming) method in which a forming raw material containing a ceramic material and a forming auxiliary agent is kneaded, to form a kneaded material by a vacuum clay kneader. Moreover, another example of the method is a continuous forming method in which a kneaded material is directly formed of mixed powder. There is not any special restriction on the ceramic material included in the forming raw material, and the ceramic material for use as the forming raw material can be used in a heretofore known manufacturing method of the ceramic honeycomb structure. Examples of the ceramic material include cordierite, a cordierite forming raw material, silicon carbide, and alumina. It is to be noted that the cordierite forming raw material is a ceramic raw material blended so as to obtain a chemical composition in which silica is in a range of 42 to 56 mass %, alumina is in a range of 30 to 45 mass %, and magnesia is in a range of 12 to 16 mass %. The cordierite forming raw material is fired to become cordierite.

Moreover, the forming raw material contains water which is a dispersion medium. Furthermore, the forming raw material may contain a pore former, a binder, a dispersant, a surfactant, and the like if necessary. The pore former, the binder, the dispersant, the surfactant and the like which are used in the heretofore known manufacturing method of the ceramic honeycomb structure can preferably be used.

Next, the forming raw material is formed into a honeycomb-like shape by, for example, extrusion-forming, to obtain a cylindrical formed honeycomb body in which a plurality of cells extending from one end surface to the other end surface are formed with partition walls. Examples of the forming method include an intermittent extrusion-forming method and a continuous extrusion-forming method. In the extrusion-forming, there is preferably used a die having a desirable whole shape, cell shape, partition wall thickness, cell density, and the like.

Next, the obtained formed honeycomb body is cut in a cell extending direction of the formed honeycomb body. It is to be noted that the formed honeycomb body is cut so that a length of each cut formed honeycomb body in the direction from the one end surface toward the other end surface becomes larger than the finished dimension of the honeycomb structure. A portion longer than the finished dimension of each formed honeycomb body is cut and removed in the finishing step.

Next, the out formed honeycomb body is dried to obtain the dried honeycomb body. There is not any special restriction on a drying method, and examples of the method include hot air drying, microwave drying, dielectric drying, reduced pressure drying, vacuum drying, and freeze drying. Above all, the dielectric drying, the microwave drying and the hot air drying are preferably performed alone or as a combination.

(1-2) Finishing Step:

Next, as shown in FIG. 1 and FIG. 2A to FIG. 2E, the one end surface 61 and the other end surface 62 of the dried ceramic honeycomb body 50 are subjected to the finishing step, to obtain the finished dried ceramic honeycomb body 70. In this finishing step, the dried ceramic honeycomb body 50 is processed so that the length from the one end surface 61 to the other end surface 62 of the dried ceramic honeycomb body becomes the finished dimension m. In this case, as described above, the contour of the diametrical dimension of the dried ceramic honeycomb body prior to performing the finishing step is measured.

There is not any special restriction on a measuring method of the contour. For example, the contour can be measured by a laser displacement meter 67 as shown in FIG. 2A. As the laser displacement meter 67, a reflective type non-contact laser displacement meter can suitably be used. By such a laser displacement meter, the contour of the dried ceramic honeycomb body 50 can more accurately be measured.

There is not any special restriction on the number of the measurement points of the contour in the circumferential direction of the dried ceramic honeycomb body 50. However, when the number of the measurement points increases, it is further possible to obtain such a measurement point that the total of the absolute values of the differences between the respective values of the four contours further decreases. In consequence, the ceramic honeycomb structure having a more excellent perpendicularity can be manufactured with a higher yield.

The contour of the dried ceramic honeycomb body 50 is measured as follows. That is, the contour is measured at a plurality of measurement points of the first measuring portion Q1 while shifting a measurement position from the contour measurement start point P1 around the whole periphery of the circumferential direction (i.e., the first measuring portion Q1) including the contour measurement start point P1 in this circumferential direction. Similarly, the contour is measured at a plurality of measurement points of the second measuring portion Q2 while shifting the measurement position from the contour measurement start point P2 around the whole periphery of the circumferential direction (i.e., the second measuring portion Q2) including the contour measurement start point P2 in this circumferential direction.

There is not any special restriction on a temperature of the dried ceramic honeycomb body at the measurement of the contour, but the temperature of the dried ceramic honeycomb body is preferably from 20 to 150° C. The temperature of the dried ceramic honeycomb body is more preferably room temperature, if possible. The temperature of the dried ceramic honeycomb body obtained by drying the formed ceramic honeycomb body is from about 50 to 150° C., and it is also possible to measure the contour after cooling this dried ceramic honeycomb body to room temperature once. However, when the dried ceramic honeycomb body is cooled to room temperature, a heat efficiency and an operation efficiency deteriorate. Conversely, when the dried ceramic honeycomb body obtained by drying the formed ceramic honeycomb body can immediately be used in the measurement of the contour, the operation efficiency can further be enhanced. In the measurement of the contour, the measurement result may or may not be subjected to temperature correction. In the manufacturing method of the ceramic honeycomb structure of the present embodiment, "the total of the absolute values of the differences between the respective values of the four contours" is obtained, and hence there are not any essential conditions on the temperature correction. When the temperature correction is performed, "a reference diametrical dimension" of the formed ceramic honeycomb body is corrected to "the reference outer diameter dimension corresponding to the temperature", by beforehand measuring thermal expansion coefficients of the ceramic material and the forming auxiliary agent.

As shown in FIG. 2A, the measurement of the contour is preferably performed by mounting the dried ceramic honeycomb body 50 on the measurement table 65 on which the object to be measured can horizontally be mounted. When the measurement table 65 is used, the contours of the first measuring portion Q1 and the second measuring portion Q2 can easily be measured. When the laser displacement meter 67 is, for example, a fixed type, two laser displacement meters 67 are preferably arranged to simultaneously measure the contours of the first measuring portion Q1 and the second measuring portion Q2. By rotating the measurement table 65, on which the dried ceramic honeycomb body 50 is mounted, one revolution in a horizontal plane, it is possible to continuously measure the contours of the first measuring portion Q1 and the second measuring portion Q2. The laser displacement meter 67 may be a movable type. Moreover, spacers 66 are preferably arranged between the measurement table 65 and the one end surface 61 of the dried ceramic honeycomb body 50. In the dried ceramic honeycomb body 50, flatness of the end surface 61 deteriorates by cutting and drying steps at forming, and hence when the measurement table 65 rotates, the dried honeycomb body 50 might move by a centrifugal force. To acquire a measurement precision of the contour, the spacers 66 are preferably arranged in three portions.

At the end of the measurement of the contour, "the total of the absolute values of the differences between the respective values of the four contours" is obtained, the fix positions to be supported by the first fixture 68a and the second fixture 68b are determined, and then the measurement table 65 may further be rotated by a predetermined angle. More specifically, first, "the totals of the absolute values of the differences between the respective contours" calculated at the respective measurement points are compared, to find a position where a value of the total is minimum. When a plurality of such "minimum values of the values of the totals" are present, for example, the measurement point closest to the contour measurement start point P1 is selected. When the measurement point is selected in this manner, a time to rotate the measurement table by the predetermined angle can be shortened. Next, a phase between the second measurement point P1y and the contour measurement start point P1 at the four measurement points at which "the total of the absolute values of the differences between the respective values of the four contours" is minimum is "an optimum chuck angle". Then, the measurement table 65 is rotated by the phase from the contour measurement start point P1 to the optimum chuck angle. In consequence, the dried ceramic honeycomb body 50 on the measurement table 65 rotates by the optimum chuck angle, and the dried ceramic honeycomb body 50 in this state is chucked by a conveyance chuck, and conveyed to the first fixture 68a and the second fixture 68b. According to such a constitution, the four measurement points at which "the total of the absolute values of the differences between the respective values of the four contours" is minimum are fixed as follows. That is, the above-mentioned four measurement points at which the total is minimum are fixed at the first fix position C1yny and second fix position C1xnx of the first fixture 68a and the third fix position C1yny and fourth fix position C2xnx of the second fixture 68b.

Figure 6:
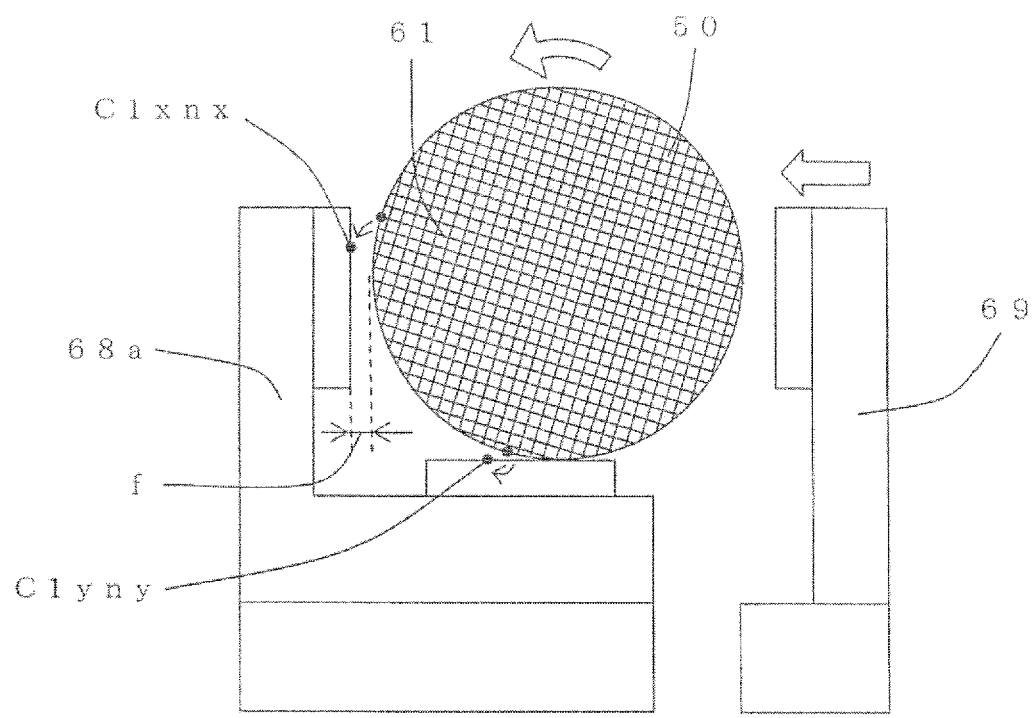
FIG. 6 is a plan view showing a state immediately after the dried ceramic honeycomb body is mounted on the first fixture and the second fixture.

When the dried ceramic honeycomb body 50 is conveyed to the first fixture 68a and the second fixture 68b, a clearance f is preferably disposed between the dried ceramic honeycomb body 50 and each of the first fixture 68a and the second fixture 68b. The clearance f is disposed to prevent collision. Here, FIG. 6 is a plan view showing a state immediately after the dried ceramic honeycomb body is mounted on the first fixture and the second fixture. The dried ceramic honeycomb body 50 is mounted on the first fixture 68a and the second fixture 68h as shown in FIG. 6. Afterward, when the auxiliary fixture 69 moves to the left side on paper surface, the dried ceramic honeycomb body 50 rotates counterclockwise. By this rotation, the dried ceramic honeycomb body 50 is fixed by two portions of each of the first fixture 68a and the second fixture 68b. However, when the dried ceramic honeycomb body 50 rotates as described above, the optimum chuck angle after shape measurement shifts, so that the dried ceramic honeycomb body is fixed by the first fixture 68a and the second fixture 68b. Therefore, when the dried ceramic honeycomb body 50 is conveyed via the clearance f disposed between the dried ceramic honeycomb body and each of the first fixture 68a and the second fixture 68b, it is necessary to perform correction in consideration of the rotation at the fixing of the dried ceramic honeycomb body 50. Specifically, when the measurement table 65 is rotated by the optimum chuck angle after the end of the shape measurement shown in FIG. 2A, the correction is performed as much as a rotation angle at the fixing (i.e., as much as the rotation angle in accordance with the clearance f). According to such a constitution, the four measurement points at which "the total of the absolute values of the differences between the respective values of the four contours" is minimum can be fixed at the first fix position C1yny and second fix position C1xnx of the first fixture 68a and the third fix position C2yny and fourth fix position C2xnx of the second fixture 68b.

Even when the direction L from the one end surface toward the other end surface of the dried ceramic honeycomb body 50 mounted on the measurement table 65 slightly tilts from the vertical direction, an influence on the value of the contour is remarkably small. Therefore, even when the bottom surface of the dried ceramic honeycomb body 50 mounted on the measurement table 65 tilts to the surface of the measurement table 65, the above influence due to the tilt of the bottom surface is remarkably small even at the calculation of the total of the absolute values of the differences between the respective values of the contours. That is, when the dried ceramic honeycomb body 50 is mounted on the measurement table 65, the end surfaces of the dried ceramic honeycomb body 50 may slightly tilt to the horizontal plane, on the assumption that the dried ceramic honeycomb body 50 does not move during the rotation of the measurement table 65. When the dried ceramic honeycomb body 50 is mounted on the measurement table 65, a height difference of the tilt of the bottom surface of the dried ceramic honeycomb body 50 to the horizontal plane is preferably 4 mm or less. Here, the above "height difference of the tilt of the bottom surface" is a distance at which a distance difference between the bottom surface of the dried honeycomb body 50 and the surface of the measurement table 65 is maximum. The dried honeycomb body 50 is disposed on the measurement table 65 so that "the direction L from the one end surface 61 toward the other end surface 62" turns to the vertical direction.

When the measurement table 65 on which the dried ceramic honeycomb body 50 is mounted is rotated one revolution in the horizontal plane, the rotation center of the measurement table 65 may slightly shift from a central axis in the direction from the one end surface toward the other end surface of the dried ceramic honeycomb body 50. The shift may be in an allowable range of the measurement of the laser displacement meter, and in a range in which the dried ceramic honeycomb body 50 does not move at the rotation of the measurement table 65. When the respective contours are measured on the same conditions at the positions which match each other in the direction from the one end surface toward the other end surface, the above-mentioned optimum chuck angle can be found from "the total of the absolute values of the differences between the respective contours". The contour is a shape obtained by subjecting measurement data to best fit processing according to the reference diametrical dimension by the least squares method, spline interpolation (an interpolating method) or the like (i.e., a processing making an amount shifted from a reference value minimum). Moreover, measured contour data (i.e., the measurement result) is stored in an X-Y coordinate. That is, in the contour measurement of the dried ceramic honeycomb body 50, measurement coordinate data is shifted and stored for reasons such as the following (1) and (2). (1) The dried ceramic honeycomb body is set in an arbitrary place of the measurement table 65, and the measurement coordinate data individually vary. (2) When the dried ceramic honeycomb body 50 bends, the diametrical dimensions of the first measuring portion Q1 and the second measuring portion Q2 can be measured, but the measurement coordinate of the first measuring portion Q1 is different from that of the second measuring portion Q2. Therefore, the measurement coordinate data of the first measuring portion Q1 and the measurement coordinate data of the second measuring portion Q2 are individually subjected to the best fit processing according to the reference diametrical dimension by the minimum square method. In consequence, the data of the contours of the first measuring portion Q1 and the second measuring portion Q2 can be processed in the same coordinate, and it is possible to calculate "the total of the absolute values of the differences between the respective contours".

When the total of the absolute values of the differences between the respective values of the four contours is obtained for every measurement point, the first measurement point P1x and second measurement point P1y of the first measuring portion Q1 are preferably in a range of 60 to 120° in the circumferential direction. In other words, the phase between the first measurement point P1x and the second measurement point P1y is preferably from 60 to 120°. Similarly, the third measurement point P2x and the fourth measurement point P2y of the second measuring portion Q2 are also in a range of 60 to 120° in the circumferential direction. The first measurement point P1x and the second measurement point P1y are fix points by the first fixture, when the dried ceramic honeycomb body is fixed by the first fixture. When the phase between the first measurement point P1x and the second measurement point P1y is smaller than 60° or in excess of 120° in the circumferential direction, it is difficult to stably fix the dried ceramic honeycomb body sometimes. The phase eon the first measurement point P1x and the second measurement point P1y is further preferably 90°.

Hereinafter, there will be described a specific example where the outer wall 63 of the dried ceramic honeycomb body 50 is fixed by the first fixture 68a and the second fixture 68b and subjected to the finishing step in this state as shown in FIG. 2B to FIG. 2E. The following specific example is an example where a fixing angle of each of the first fixture 68a and the second fixture 68b is 90°. The first fixture 68a and the second fixture 68b have the same shape, and the first fixture 68a and the second fixture 68b are arranged in such a positional relation that the fix positions of the respective lowermost points are horizontal and that the first fixture 68a is parallel to the second fixture 68b. Moreover, the first fixture 68a and the second fixture 68b are arranged in parallel with the cutting tools 75a and 75b. That is, the one end surface and the other end surface of the dried ceramic honeycomb body 50 cut by the cutting tools 75a and 75b are the surfaces parallel to the first fixture 68a and the second fixture 68b.

Here, an example of the result obtained by measuring the contour is shown in FIG. 3. In FIG. 3, the ordinate indicates the contour (mm), and the abscissa indicates a contour measurement angle (°). The contour measurement angle (°) is the angle at the measurement point of each contour, when each of the contour measurement start points P1 and P2 is 0° and the measurement around the side surface of the dried ceramic honeycomb body is 360°. FIG. 3 shows the contour measurement result in the first measuring portion Q1 and the contour measurement result in the second measuring portion Q2. In the first measuring portion Q1 and the second measuring portion Q2, the contours are measured at 3000 points, respectively.

As shown in FIG. 3, the contour measured at the first measurement point P1x of the first measuring portion Q1 is "the contour C1x". Moreover, the contour measured at the second measurement point P1y present at the position shifted by a phase of 90° from the first measurement point P1x of the first measuring portion Q1 (i.e., the position where the contour measurement angle is away as much as 90°) is "the contour C1y". Similarly, the contour measured at the third measurement point P2x of the second measuring portion Q2 which is present at the position of the same phase as the first measurement point P1x is "the contour C2x". Moreover, the contour measured at the fourth measurement point P2y of the second measuring portion Q2 which is present at the position of the same phase as the second measurement point P1y is "the contour C1y". Here, the measurement point present at the position shifted by the shift of 90° from the first measurement point P1x is the second measurement point P1y, because the fixing angle of each of the first fixture and the second fixture is 90°. Therefore, when the fixing angle of each of the first fixture and the second fixture is another angle, the phase of the second measurement point P1y (i.e., the position of the second measurement point P1y) is determined in accordance with the angle.

A solid line k1 and a broken line k2 shown in FIG. 3 are lines drawn at positions away from each other by a contour measurement angle of 90°. For example, in the case of movement around the whole periphery of a graph shown in FIG. 3 in a state where the positions of the solid line k1 and the broken line k2 which are 90° away from each other are maintained, values of four points present on the solid line k1 and the broken line k2 are the contour C1x, the contour C1y, the contour C2x, and the contour C2y. It is to be noted that the contour C1x is the contour measured at the first measurement point P1x. The contour C1y is the contour measured at the second measurement point P1y. The contour C2x is the contour measured at the third measurement point P2x. The contour C2y is the contour measured at the fourth measurement point P2y.

Here, there will be described a calculating method of the total of the absolute values of the differences between the respective values of the four contours, when the contours C1x, C1y, C2x and C2y shown in FIG. 3 are selected. The total of the absolute values of the differences between the respective values of the contours can be obtained in accordance with the above equation (1). The values of C1x, C1y, C2x and C2y in the above equation (1) are the values (mm) of the contours C1x, C1y, C2x, and C2y in FIG. 3.

For the total of the absolute values of the differences between the respective values of the contours, first, the absolute values of the differences between the respective values of the four contours as objects to be calculated. As described above, when the contours C1x, C1y, C2x, and C2y are selected, the following four absolute values are obtained, respectively. That is, the four absolute values are the absolute value obtained in accordance with C1x–C2x, the absolute value obtained in accordance with C1y–C2y, the absolute value obtained in accordance with C1x–C1y, and the absolute value obtained in accordance with C2x–C2y.

In the example shown in FIG. 3, in the vicinities of contour measurement angles of 90° and 180°, the total of the absolute values of the differences between the respective values of the four contours is minimum. Therefore, when the dried ceramic honeycomb body 50 is mounted on the L-shaped first fixture 68a and second fixture 68b as shown in FIG. 2B to FIG. 2D, the position of the contour measurement angle of 180° is fixed as follows. That is, the position of the contour measurement angle of 180° is fixed at the first fix position C1yny of the first fixture 68a and the third fix position C2yny of the second fixture 68b. On the other hand, the contour measurement angle of 90° is automatically fixed at the second fix position C1xnx of the first fixture 68a and the fourth fix position C2xnx of the second fixture 68b. For example, even when a shape of a finish fixture is V-shaped, the dried ceramic honeycomb body is fixed at the fixing angle of 90° with the same idea. In consequence, when the dried ceramic honeycomb body 50 is subjected to the finishing step in a state where the measurement point corresponding to the optimum chuck angle of the dried ceramic honeycomb body 50 is fixed by the first fixture 68a and the second fixture 68b, the ceramic honeycomb structure having an excellent perpendicularity can be obtained.

Figure 4:
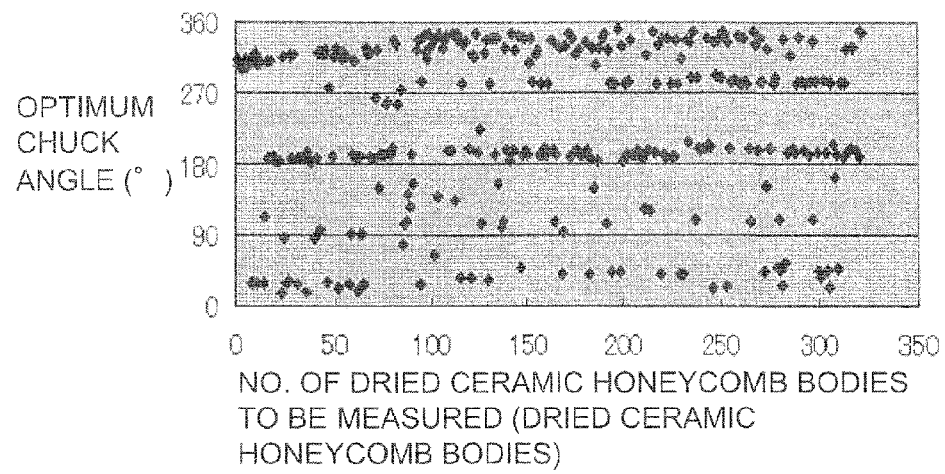
FIG. 4 is a graph showing a distribution of optimum chuck angles of the dried ceramic honeycomb body.

Here, FIG. 4 shows a calculation result of the optimum chuck angle of the dried ceramic honeycomb body. FIG. 4 is a graph showing a distribution of the optimum chuck angle of the dried ceramic honeycomb body. In FIG. 4, the ordinate indicates an angle) (°) at which the optimum chuck angle is calculated and the lowermost points of the first fix position C1yny of the first fixture 68a and the third fix position C1yny of the second fixture 68b are fixed, and the ordinate indicates the number of the dried ceramic honeycomb bodies to be measured (the dried ceramic honeycomb bodies). As shown in FIG. 4, the optimum chuck angle of the dried ceramic honeycomb body is a different value for each dried ceramic honeycomb body over the whole region in the circumferential direction. In consequence, when a plurality of dried ceramic honeycomb bodies having different optimum chuck angles are constantly subjected to the finishing step at a predetermined angle, the perpendicularity deteriorates. In the manufacturing method of the ceramic honeycomb structure of the present embodiment, the optimum chuck angle is obtained for each dried ceramic honeycomb body, and then the dried ceramic honeycomb body is subjected to the finishing step by the above-mentioned method, so that the perpendicularity can effectively be prevented from being deteriorated.

There is not any special restriction on a method of disposing the dried ceramic honeycomb body 50 on the first fixture 68a and the second fixture 68b as shown in FIG. 2B and FIG. 2C. For example, the dried ceramic honeycomb body is preferably conveyed as follows. That is, first, after measuring the contour by the method shown in FIG. 2A, the measurement table 65 is rotated by the angle at which the dried ceramic honeycomb body is fixed by the lowermost points of the first fix position C1yny of the first fixture 68a and the third fix position C2yny of the second fixture 68b. Afterward, the dried ceramic honeycomb body 50 in this state is preferably conveyed to the first fixture 68a and the second fixture 68b by the conveyance chuck (not shown). It is to be noted that as described above, the first fix position C1yny of the lowermost point of the first fixture 68a fixes "the second measurement point P1y at which the contour C1y is measured in the four measurement points where "the total of the absolute values of the differences between the respective contours" is minimum". Moreover, the third fix position C2yny of the lowermost point of the second fixture 68b fixes "the fourth measurement point P2y at which the contour C1y is measured in the four measurement points where "the total of the absolute values of the differences between the respective contours" is minimum". That is, the dried ceramic honeycomb body 50 rotated one revolution to the contour measurement start point after the end of the measurement of the contour is further rotated by the optimum chuck angle. By rotating the dried ceramic honeycomb body by the optimum chuck angle, the measured dried ceramic honeycomb body 50 is constantly fixed at the optimum chuck angle by the first fixture 68a and the second fixture 68b. Such contour measurement is performed for all the dried ceramic honeycomb bodies. Consequently, in the manufacturing method of the ceramic honeycomb structure of the present embodiment, the first fixture 68a, the second fixture 68b, the cutting tools 75a and 75b and the like are not adapted to the difference in shape between the respective dried ceramic honeycomb bodies. In the manufacturing method of the ceramic honeycomb structure of the present embodiment, the optimum chuck angle of each dried ceramic honeycomb body is determined in accordance with the contour. Therefore, it is very advantageous that a large part of a manufacturing equipment which has been used in the conventional manufacturing method of the ceramic honeycomb structure can be used as it is and that any new manufacturing equipments are not required.

Afterward, the end surfaces of the dried ceramic honeycomb body 50 mounted on the first fixture 68a and the second fixture 68b are subjected to the finishing step by the cutting tools 75a and 75b.

As described above, the finished dried ceramic honeycomb body having the excellent perpendicularity can be obtained. In the manufacturing method of the ceramic honeycomb structure of the present embodiment, the perpendicularity of the finished dried ceramic honeycomb body to be obtained can be enhanced irrespective of the size of the diametrical dimension of the dried ceramic honeycomb body. Therefore, the manufacturing method of the ceramic honeycomb structure of the present embodiment is suitable for a case where the outer diameter dimension of the dried ceramic honeycomb body is 100 mm or more, and further suitable for a case where the diametrical dimension of the dried ceramic honeycomb body is 150 mm or more. When the diametrical dimension of the dried ceramic honeycomb body is 100 mm or more, the contour of the peripheral surface of the dried ceramic honeycomb body is large, and in the finishing step of the conventional manufacturing method, the perpendicularity remarkably deteriorates. Moreover, the manufacturing method of the ceramic honeycomb structure of the present embodiment is more suitable for a case where a one-side tolerance of a diameter of the dried ceramic honeycomb body is larger than the perpendicularity. That is, even when the allowable range to the perpendicularity is more strict, the suitable perpendicularity can be realized according to the manufacturing method of the ceramic honeycomb structure of the present embodiment. The diametrical dimension tolerance is a product standard of the diametrical dimension, and is a difference between a maximum dimension and a minimum dimension of an error allowed in each manufacturing stage.

In the manufacturing method of the ceramic honeycomb structure of the present embodiment, shape measurement of the dried ceramic honeycomb body can also be performed on the basis of the measurement result of the contour described above. That is, it can be judged from the measurement result of the contour whether or not the outer peripheral shape of the dried ceramic honeycomb body satisfies regulated conditions. For example, when the maximum value and the minimum value of the contour measured around the whole periphery in the circumferential direction are in a regulated numeric range, it is judged that "the regulated conditions are satisfied". Moreover, when the maximum value and the minimum value of the contour measured around the whole periphery in the circumferential direction are out of the regulated numeric range, it is judged that "the regulated conditions are not satisfied". The dried ceramic honeycomb body which does not satisfy the regulated conditions may not be subjected to the finishing step. For example, even if the dried ceramic honeycomb body having an excessively large difference between the maximum value and the minimum value of the contour is subjected to the finishing step for enhancing the perpendicularity, the allowable range of the perpendicularity is not satisfied sometimes.

When the above-mentioned shape measurement of the dried ceramic honeycomb body is performed, the finishing step is performed to obtain the end surfaces having the excellent perpendicularity, and the dried ceramic honeycomb body having the outer peripheral shape which does not satisfy the regulated conditions can be removed prior to the finishing step. The dried ceramic honeycomb body having the outer peripheral shape which does not satisfy the regulated conditions is judged to be defective by a final inspection, and hence by removing such a dried ceramic honeycomb body prior to the finishing step, unnecessary finishing, firing and inspection steps can be omitted. In the above-mentioned shape measurement, the contour may be measured by, for example, the following method. First, in addition to the contour measurement start points P1 and P2 away from each other in the direction from the one end surface toward the other end surface of the peripheral surface of the dried ceramic honeycomb body, a contour measurement start point may also be disposed in the center. That is, the contour measurement start points are disposed at three positions in the direction L from the one end surface toward the other end surface, and the contours are measured around the whole peripheries in the respective circumferential directions including the respective contour measurement start points. Then, it is judged from the measurement results of the contours measured around the three whole peripheries in the circumferential direction whether or not the outer peripheral shape of the dried ceramic honeycomb body satisfies the regulated conditions. According to such a constitution, more precise shape measurement can be performed.

(1-3) Firing Step:

In the manufacturing method of the ceramic honeycomb structure of the present embodiment, the finished dried ceramic honeycomb body obtained in this manner is fired to obtain the ceramic honeycomb structure. In consequence, it is possible to obtain the ceramic honeycomb structure in which the suitable perpendicularity of each end surface of the finished dried ceramic honeycomb body is reflected.

When the firing is performed, degreasing is first performed to remove the forming auxiliary agent and the like, and furthermore, a temperature is continuously raised to perform the firing, thereby forming the ceramic honeycomb structure. There is not any special restriction on degreasing and firing conditions. The degreasing and firing are preferably performed on conditions suitable for the forming raw material of the dried ceramic honeycomb body. For example, the degreasing is preferably performed in accordance with a type of an organic material which is the forming auxiliary agent and the like in the forming raw material, and an amount of the organic material to be added. Examples of the above organic material include an organic binder, dispersant and pore former. The firing conditions (temperature and time) vary in accordance with a type of the forming raw material, and hence suitable conditions may be selected in accordance with the type thereof. The firing temperature is usually, for example, about 1400 to 1600° C., but is not limited to this example. The degreasing and the firing may be performed in separate steps. The degreasing and firing can be performed by using an electric furnace, a gas furnace, or the like.

(1-4) Plugged Portion Preparing Step:

The manufacturing method of the ceramic honeycomb structure of the present embodiment may further include a plugged portion preparing step. The plugged portion preparing step is a step of filling a plugging material into the cells of the finished dried ceramic honeycomb body or the ceramic honeycomb structure. The method includes such a plugged portion preparing step, and hence it is possible to manufacture a plugged ceramic honeycomb structure in which plugged portions are arranged in open frontal areas of the cells of the ceramic honeycomb structure in a checkered pattern.

The plugged ceramic honeycomb structure can be used as a filter to remove impurities in a fluid. An example of such a filter is an exhaust gas purifying filter to remove a particulate matter in an exhaust gas. An example of the exhaust gas purifying filter is a diesel particulate filter to remove the particulate matter in the exhaust gas discharged from a diesel engine.

The plugged portion preparing step can be performed in conformity to a step similar to a plugged portion preparing step in the heretofore known manufacturing method of the plugged ceramic honeycomb structure. The plugged portion preparing step is preferably performed after performing the finishing step or the firing step.

Hereinafter, there will be described an example where the finished dried ceramic honeycomb body subjected to the finishing step is subjected to the plugged portion preparing step. First, a slurry-like plugging material is filled into one open frontal area of each predetermined cell and the other open frontal area of each remaining cell of the finished dried ceramic honeycomb body. When the plugging material is filled into the open frontal areas of the cells of the finished dried ceramic honeycomb body, first the plugging material is filled into the one open frontal area, and then the plugging material is filled into the other open frontal area.

An example of a method of filling the plugging material into the one open frontal area is the following method. First, a sheet is attached to one end surface of the finished dried ceramic honeycomb body. Next, this sheet is provided with holes through which the plugging material is filled at such positions as to form a checked pattern. The holes through which the plugging material is filled correspond to positions where the cells to be provided with the plugged portions are present. The finished dried ceramic honeycomb body, to which the sheet is attached, is pressed into a container where the plugging material is stored. That is, an end of the finished dried ceramic honeycomb body to which the sheet is attached is pressed into the above container. In consequence, the plugging material is filled into the predetermined cells through the holes of the sheet.

After filling the plugging material into the one open frontal area of each of the cells, the plugging material is filled into the other open frontal area of each of the remaining cells by a method similar to the above-mentioned method. That is, the sheet is also attached to the other end surface of the finished dried ceramic honeycomb body in the same manner as in the one end surface, and the plugging material is filled by the method similar to the above method.

The plugging material filled into the cells of the finished dried ceramic honeycomb body is dried, so that the plugged portions can be formed. It is to be noted that the plugging material may be dried every one open frontal area. Usually, after drying the plugging material filled into the cells, the finished dried ceramic honeycomb body is fired, to manufacture a diesel particulate filter.

EXAMPLES

Hereinafter, the present invention will specifically be described with respect to examples, but the present invention is not limited to these examples.

Example 1

First, a dried ceramic honeycomb body to be subjected to a finishing step was prepared. To prepare the dried ceramic honeycomb body, a cordierite forming raw material was used as a ceramic raw material. A predetermined amount of a forming auxiliary agent was added to the cordierite forming raw material, and water was also added, to prepare mixed powder.

Next, the obtained mixed powder was extruded by using a die to obtain a formed ceramic honeycomb body. The extrusion-forming was performed by continuous forming, to prepare the cylindrical formed ceramic honeycomb body provided with a plurality of cells extending from one end surface to the other end surface. Next, the formed ceramic honeycomb body was cut in a cell extending direction so that a length in the cell extending direction was larger than a finished dimension.

Next, the formed ceramic honeycomb body was dried, to prepare a dried ceramic honeycomb body. As the drying, a combination of dielectric drying and hot air drying was performed.

Next, as shown in FIG. 2A, an obtained dried ceramic honeycomb body 50 was mounted on a rotatable measurement table 65 in a horizontal plane. A contour of the surface of an outer wall 63 of the dried ceramic honeycomb body 50 in a circumferential direction was continuously measured by a laser displacement meter 67. Specifically, first, two positions away from each other in a direction from one end surface 61 toward the other end surface 62 of the surface of the outer wall 63 of the dried ceramic honeycomb body 50 were a contour measurement start point P1 and a contour measurement start point P2. Moreover, in a first measuring portion Q1 disposed around a periphery including the contour measurement start point P1 in a circumferential direction R, the contour of an diametrical dimension of the dried ceramic honeycomb body 50 was measured at a plurality of measurement points while shifting a measurement position from the contour measurement start point P1 in the circumferential direction R. Furthermore, also in a second measuring portion Q2 disposed around a periphery including the contour measurement start point P2 in the circumferential direction R, the contour was measured at a plurality of measurement points while shifting a measurement position from the contour measurement start point P2 in the circumferential direction R. As the laser displacement meter 67, a reflective type non-contact laser displacement meter was used. The contour was measured at 3000 points per circumference in the circumferential direction. That is, the contour at each point of the surface of the outer wall 63 of the dried ceramic honeycomb body 50 was measured every 0.12° from the contour measurement start point. Additionally, in Example 1, spacers 66 in FIG. 2A were not arranged between the measurement table 65 and the one end surface 61 of the dried ceramic honeycomb body 50, but the contour was measured. Moreover, in Example 1, as each of a first fixture and a second fixture for use in finishing step, a fixture having a fixing angle of 90° was used.

From the obtained measurement result, a total of absolute values of differences between respective values of four contours was obtained for each of 3000 measurement points. Here, the contour measured at the contour measurement start point P1 was "a contour C1 (0°)", and the contour measured at the contour measurement start point P2 was "a contour C2 (0°)". Moreover, the contour measured at the measurement point moved by n° from the contour measurement start point P1 in the circumferential direction was "the contour C1 (n°)". The above "n°" was a contour measurement angle (°) when the contour measurement start point P1 was 0° (see FIG. 3). Similarly, the contour measured at the measurement point moved by n° from the contour measurement start point P2 in the circumferential direction was "the contour C2 (n°)". For example, the contour measured at the measurement point moved by 0.12° from the contour measurement start point P1 in the circumferential direction was "the contour C1 (0.12°)".

First, a total $N_0$ of absolute values of differences between respective values of the four contours, i.e., the contour C1

(0°), the contour C1 (90°), the contour C2 (0°), and the contour C2 (90°). "The total $N_0$ of the absolute values of the differences between the respective values of the contours" means that the contour measurement start point P1 was selected as "a first measurement point P1x to calculate the total of the absolute values of the differences between the respective values of the contours". Moreover, in the calculation of "the total $N_0$ of the absolute values of the differences between the respective values of the contours", the values of the contours of the contour measurement angles of 0° and 90° were used, because the fixing angle of each of the first fixture and the second fixture was 90'.

Next, a total $N_{0.12}$ of the absolute values of the differences between the respective values of the four contours of the contour C1 (0.12°), the contour C1 (90.12°), the contour C2 (0.12°), and the contour C2 (90.12°). Subsequently, the totals of the absolute values of the differences between the respective values of the four contours at 3000 points were obtained while successively moving, in the circumferential direction, the measurement point to obtain the total value of the absolute values of the differences between the respective values of the four contours. Hereinafter, "the total of the absolute values of the differences between the respective values of the four contours" will simply be called "the total of the differences between the contours" sometimes.

Next, all the obtained "totals of the differences between the contours" were compared, to find a minimum total value where "the total of the differences between the contours" was minimum. Here, an angle obtained by adding 90° to the contour measurement angle at which "the total of the differences between the contours" was minimum was "the optimum chuck angle". Additionally, when the four contours used in the calculation of the minimum total value at which "the total of the differences between the contours" was minimum were "the contour C1 (n°)", "the contour C1 ((n+90)°)", "the contour C2 (n°)", and "the contour C2 ((n+90)°)", the respective contour values were as follows. That is, "the contour C1 (n°)" was "the contour C1x measured at the first measurement point P1x". "The contour C1 ((n+90)°)" was "the contour C1y measured at the second measurement point P1y". "The contour C2 (n°)" was "the contour C2x measured at the third measurement point P2x". "The contour C2 ((n+90)°)" was "the contour C2y measured at the fourth measurement point P2y". Next, as shown in FIG. 2B and FIG. 2C, the dried ceramic honeycomb body 50 subjected to the measurement was mounted on a first fixture 68a and a second fixture 68b. The conveyance of the dried ceramic honeycomb body 50 to the first fixture 68a and the second fixture 68b was performed by the following method. First, the measurement of the contour was ended, and the dried ceramic honeycomb body 50 rotated one revolution to the contour measurement start point was further rotated by the optimum chuck angle. The dried ceramic honeycomb body 50 was rotated by rotating the measurement table 65. Next, the dried ceramic honeycomb body 50 was disposed at a first fix position C1yny and a second fix position C1xnx of the first fixture 68a and a third fix position C2yny and a fourth fix position C2xnx of the second fixture 68b.

Next, as shown in FIG. 2E, the end surfaces of the dried ceramic honeycomb body 50 mounted on the first fixture 68a and the second fixture 68b were subjected to the finishing step by cutting tools 75a and 75b, to obtain the finished dried ceramic honeycomb body. As the cutting tools 75a and 75b, disc-like grindstones were used. A distance n1 from the cutting tool 75a to the first fix position C1yny and a distance n2 from the cutting tool 75b to the third fix position C2yny were set to 6 mm. A diametrical dimension of the dried ceramic honeycomb body 50 was 100 mm. After cutting surplus portions 50a and 50b, a length from one end surface toward the other end surface of the finished dried ceramic honeycomb body (i.e., the finished dimension) was 100 mm. Table 1 shows "the diametrical dimension" of the dried ceramic honeycomb body, and "the finished dimension" of the finished dried ceramic honeycomb body.

The obtained finished dried ceramic honeycomb body was degreased, and further fired, to manufacture a ceramic honeycomb structure. The degreasing and firing were performed in an oxidation atmosphere. The highest temperature at the firing was 1430° C. The ceramic honeycomb structure of Example 1 had a cell density of 140 cells/cm², and a partition wall thickness of 75 μm. Moreover, an allowable range of a perpendicularity was 1.6 mm. Table 1 shows the cell density, the partition wall thickness, and the allowable range of the perpendicularity. According to such a method, 100 lots of 100 dried ceramic honeycomb bodies per lot were manufactured.

TABLE 1

|  | Outer dia. dimension (mm) | Finished dimension (mm) | Cell density (cells/cm²) | Partition wall thickness (μm) | Allowable range of perpendicularity (mm) | Process capability index of perpendicularity |
| --- | --- | --- | --- | --- | --- | --- |
| Example 1 | 100 | 100 | 140 | 75 | 1.6 | 20 |
| Comparative Example 1 | 100 | 100 | 140 | 75 | 1.6 | 10 |
| Example 2 | 200 | 200 | 62 | 100 | 4.5 | 10 |
| Comparative Example 2 | 200 | 200 | 62 | 100 | 4.5 | 5 |

A process capability index ($C_{pk}$) of the perpendicularity of the obtained ceramic honeycomb structure was obtained. The process capability index was obtained on the basis of the result of a sampling inspection of the perpendicularity of the obtained ceramic honeycomb structure. The result of the process capability index of the perpendicularity is shown in Table 1. Moreover, the process capability index ($C_{pk}$) was a value obtained by dividing, by 3σ, a difference between an upper limit reference value of the perpendicularity and an average value of the perpendicularities of the obtained ceramic honeycomb structure, where σ is the standard deviation.

Example 2

A dried ceramic honeycomb body was prepared so as to obtain values of an diametrical dimension, a cell density after firing and a partition wall thickness after the firing as shown in Table 1, and a ceramic honeycomb structure was manufactured so as to obtain a value of a finished dimension as shown in Table 1 by a method similar to Example 1. A process capability index ($C_{pk}$) of a perpendicularity of the obtained ceramic honeycomb structure was obtained by the method similar to Example 1. The results are shown in Table 1.

Comparative Examples 1 and 2

A ceramic honeycomb structure was manufactured by a method similar to Example 1, except that a dried ceramic honeycomb body was prepared so as to obtain values of an diametrical dimension, a cell density after firing and a partition wall thickness after the firing as shown in Table 1, and finishing step was performed by the following method. In Comparative Examples 1 and 2, a contour of the dried ceramic honeycomb body was not measured, and the dried ceramic honeycomb body was mounted on a first fixture and a second fixture and subjected to the finishing step. A process capability index ($C_{pk}$) of a perpendicularity of the obtained ceramic honeycomb structure was obtained. The results are shown in Table 1.

(Result 1)

It is seen that according to the manufacturing methods of Examples 1 and 2, the process capability index of the perpendicularity is high as compared with the manufacturing methods of Comparative Examples 1 and 2. It is considered that in Comparative Examples 1 and 2, during the finishing step, the dried ceramic honeycomb body in the tilted state is mounted on the first fixture and the second fixture sometimes, and hence the perpendicularity of the obtained ceramic honeycomb structure deteriorates to decrease the process capability index.

Examples 3 to 5

Each of dried ceramic honeycomb bodies was prepared so that an diametrical dimension, a cell density after firing and a thickness of each partition wall after the firing were values shown in Table 2, and each of ceramic honeycomb structures was then manufactured by a method similar to Example 1 so that a finished dimension of each honeycomb structure was a value shown in Table 2. That is, in a finishing step, a contour was measured along the whole circumference of the dried ceramic honeycomb body to obtain an optimum chuck angle, and each dried ceramic honeycomb body was subjected to finishing step in a state where the dried ceramic honeycomb body was fixed at the optimum chuck angle by a first fixture and a second fixture.

Examples 6 to 8

In Examples 6 to 8, when a contour was measured, as shown in FIG. 2A, spacers 66 were arranged in three portions via an equal space between a measurement table 65 and one end surface 61 of a dried ceramic honeycomb body 50. Moreover, in Examples 6 to 8, a temperature of the dried ceramic honeycomb body 50 at the measurement of the contour was 120° C. Additionally, ceramic honeycomb structures were manufactured in Example 6 by the same method as in Example 3, in Example 7 by the same method as in Example 4, and in Example 8 by the same method as in Example 5.

Comparative Examples 3 to 5

A dried ceramic honeycomb body was prepared so that an diametrical dimension, a cell density after firing and a partition wall thickness after the firing indicated values shown in Table 2, and a ceramic honeycomb structure was manufactured by a method similar to Comparative Example 1.

In Examples 3 to 8 and Comparative Examples 3 to 5, a yield (%) of a perpendicularity of an obtained ceramic honeycomb structure was obtained. That is, in Examples 3 to 8 and Comparative Examples 3 to 5, perpendicularities of all obtained ceramic honeycomb structures were measured, the ceramic honeycomb structures which satisfied an allowable range of the perpendicularity were judged to pass, and the ceramic honeycomb structures which did not satisfy the allowable range of the perpendicularity were judged to fail. The yields (%) of the perpendicularities in Examples 3 to 8 and Comparative Examples 3 to 5 were obtained from this measurement result. Hereinafter, the above-mentioned yield (%) of the perpendicularity will be called the perpendicularity yield (%) sometimes. Table 2 shows finished dimensions and perpendicularity yields (%) of Examples 3 to 8 and Comparative Examples 3 to 5.

TABLE 2

|  | Outer dia. dimension (mm) | Finished dimension (mm) | Cell density (cells/cm$^2$) | Partition wall thickness (μm) | Allowable range of perpendicularity (mm) | Perpendicularity yield (%) |
|---|---|---|---|---|---|---|
| Example 3 | 200 | 200 | 62 | 100 | 1.6 | 99 |
| Comparative Example 3 | 200 | 200 | 62 | 100 | 1.6 | 80 |
| Example 4 | 300 | 200 | 62 | 150 | 1.6 | 97 |
| Comparative Example 4 | 300 | 200 | 62 | 150 | 1.6 | 50 |
| Example 5 | 300 | 100 | 62 | 150 | 1.0 | 97 |
| Comparative Example 5 | 300 | 100 | 62 | 150 | 1.0 | 30 |
| Example 6 | 200 | 200 | 62 | 100 | 1.6 | 99 |
| Example 7 | 300 | 200 | 62 | 150 | 1.6 | 97 |
| Example 8 | 300 | 100 | 62 | 150 | 1.0 | 97 |

Examples 9 and 10

A ceramic honeycomb structure was manufactured by using a dried ceramic honeycomb body manufactured as follows.

In Example 9, silicon carbide (SiC) powder and metal silicon (Si) powder were mixed at a mass ratio of 80:20, a predetermined amount of a forming auxiliary agent was added to this mixture, and water was added to prepare the mixed powder. The obtained mixed powder was intermittently subjected to ram type extrusion-former, and extruded into a honeycomb-like shape to prepare a cylindrical formed ceramic honeycomb body. Next, the formed ceramic honeycomb body was cut in a cell extending direction so that a length of the formed ceramic honeycomb body in the cell extending direction was larger than a finished dimension.

The obtained formed ceramic honeycomb body was dried by a method similar to Example 1, to obtain the dried ceramic honeycomb body. The obtained dried ceramic honeycomb body was subjected to finishing step by a method similar to Example 1, to obtain the finished dried ceramic honeycomb body. The obtained finished dried ceramic honeycomb body was degreased, and further fired, to manufacture the ceramic honeycomb structure. The degreasing and firing were performed in an argon atmosphere. The highest temperature at the firing was 1430° C.

In Example 10, α-alumina powder and aluminum hydroxide powder were mixed at a mass ratio of 85:15, a predetermined amount of a forming auxiliary agent was added to this mixture, and water was added to prepare mixed powder. The ceramic honeycomb structure was manufactured by a method similar to Example 9, except that degreasing and firing were performed in an oxidation atmosphere, and the highest temperature at the firing was 1550° C.

Process capability indexes ($C_{pk}$) of perpendicularities of ceramic honeycomb structures obtained in Examples 9 and 10 were obtained by a method similar to Example 1. Table 3 shows diametrical dimensions, finished dimensions, cell densities after the firing, partition wall thicknesses after the firing, allowable ranges of perpendicularities, and process capability indexes ($C_{pk}$) of the perpendicularities of Examples 9 and 10.

prepare the dried ceramic honeycomb body, 5 parts by mass of resin balloons were added to 100 parts by mass of a ceramic raw material, a predetermined amount of a forming auxiliary agent was further added, and water was added, to prepare mixed powder. The obtained mixed powder was intermittently subjected to ram type extrusion-former, and extruded into a honeycomb-like shape, to prepare a cylindrical formed ceramic honeycomb body. Next, the formed ceramic honeycomb body was cut in a cell extending direction so that a length of the formed ceramic honeycomb body in the cell extending direction was larger than a finished dimension.

The obtained formed ceramic honeycomb body was dried by a method similar to Example 1, to obtain the dried ceramic honeycomb body. The obtained dried ceramic honeycomb body was subjected to finishing step by the method similar to Example 1, to obtain the finished dried ceramic honeycomb body. That is, in the finishing step, the contour around the whole circumference of the dried ceramic honeycomb body in the direction was measured to obtain an optimum chuck angle. Then, each dried ceramic honeycomb body was subjected to the finishing step in a state where a measurement point at the optimum chuck angle was fixed by a first fixture and a second fixture.

Next, a plugged portion preparing step was performed to fill a plugging material into the obtained finished dried ceramic honeycomb body. Specifically, a sheet was attached to one end surface of the finished dried ceramic honeycomb

TABLE 3

|  | Outer dia. dimension (mm) | Finished dimension (mm) | Cell density (cells/cm$^2$) | Partition wall thickness (μm) | Allowable range of perpendicularity (mm) | Process capability index of perpendicularity |
|---|---|---|---|---|---|---|
| Example 9 | 100 | 100 | 62 | 100 | 1.0 | 20 |
| Comparative Example 6 | 100 | 100 | 62 | 100 | 1.0 | 3 |
| Example 10 | 100 | 100 | 62 | 300 | 1.0 | 20 |
| Comparative Example 7 | 100 | 100 | 62 | 300 | 1.0 | 3 |

Comparative Examples 6 and 7

In Comparative Example 6, a ceramic honeycomb structure was manufactured by a method similar to Example 9, except that a dried ceramic honeycomb body was prepared so as to obtain values of an diametrical dimension, a cell density after firing and a partition wall thickness after the firing as shown in Table 3, and finishing step was performed by the following method. In Comparative Example 7, a ceramic honeycomb structure was manufactured by a method similar to Example 10, except that a dried ceramic honeycomb body was prepared so as to obtain values of an diametrical dimension, a cell density after firing and a partition wall thickness after the firing as shown in Table 3, and finishing step was performed by the following method. In Comparative Examples 6 and 7, a contour of the dried ceramic honeycomb body was not measured, but the dried ceramic honeycomb body was mounted on a first fixture and a second fixture, and subjected to the finishing step. A process capability index ($C_{pk}$) of a perpendicularity of the obtained ceramic honeycomb structure was obtained. The results are shown in Table 3.

Examples 11 and 12

In Examples 11 and 12, first, a dried ceramic honeycomb body to be subjected to a finishing step was prepared. To body. Next, holes through which the plugging material was filled were made in this sheet. The holes through which the plugging material was filled corresponded to positions where cells to be provided with plugged portions were present. The finished dried ceramic honeycomb body, to which the sheet was attached, was pressed into a container where the plugging material was stored, to fill the plugging material into the predetermined cells through the holes of the sheet.

After filling the plugging material into one open frontal area of each cell, the plugging material was filled into the other open frontal area of the cell by a method similar to the above-mentioned method. In the plugged portion preparing step, the plugging material was filled so as to alternately plug one open frontal area and the other open frontal area of the adjacent cells. Next, the plugging material filled into the cells of the finished dried ceramic honeycomb body was dried.

Next, the obtained finished dried ceramic honeycomb body was degreased, and further fired, to manufacture the ceramic honeycomb structure. The degreasing and firing were performed in an oxidation atmosphere. The highest temperature at the firing was 1430° C.

A perpendicularity yield (%) of the obtained ceramic honeycomb structure was obtained by a method similar to Example 3. Table 4 shows diametrical dimensions, finished dimensions, cell densities after the firing, partition wall thicknesses after the firing, allowable ranges of perpendicularities, and perpendicularity yields (%) of Examples 11 and 12.

TABLE 4

| | Outer dia. dimension (mm) | Finished dimension (mm) | Cell density (cells/cm²) | Partition wall thickness (μm) | Allowable range of perpendicularity (mm) | Perpendicularity yield (%) |
|---|---|---|---|---|---|---|
| Example 11 | 200 | 200 | 47 | 300 | 2.0 | 99 |
| Comparative Example 8 | 200 | 200 | 47 | 300 | 2.0 | 80 |
| Example 12 | 300 | 300 | 47 | 300 | 2.5 | 97 |
| Comparative Example 9 | 300 | 300 | 47 | 300 | 2.5 | 50 |

Comparative Examples 8 and 9

A ceramic honeycomb structure was manufactured by a method similar to Example 11, except that a dried ceramic honeycomb body was prepared so as to obtain values of an diametrical dimension, a cell density after firing and a partition wall thickness after the firing as shown in Table 4, and finishing step was performed by the following method. In Comparative Examples 8 and 9, a contour of the dried ceramic honeycomb body was not measured, but the dried ceramic honeycomb body was mounted on a first fixture and a second fixture, and subjected to the finishing step. A perpendicularity yield (%) of the obtained ceramic honeycomb structure was obtained by a method similar to Example 3. Table 4 shows diametrical dimensions, finished dimensions, cell densities after the firing, partition wall thicknesses after the firing, allowable ranges of perpendicularities, and perpendicularity yields (%) of Comparative Examples 8 and 9.

(Result 2)

It is seen that as shown in Table 2 and Table 4, the perpendicularity yield remarkably enhances in Examples 8, 11 and 12 as compared with Comparative Examples 3 to 5, 8 and 9. That is, when the optimum chuck angle was not obtained but the dried ceramic honeycomb body was mounted on the first fixture and the second fixture and subjected to the finishing step as in Comparative Examples 3 to 5, 8 and 9, the ceramic honeycomb structure having a poor perpendicularity was manufactured with high frequency. From the results of Comparative Examples 3 to 5, such a tendency becomes remarkable when the diametrical dimension of the ceramic honeycomb structure increases. On the other hand, in Examples 3 to 5, the contour was measured to obtain the optimum chuck angle, and each dried ceramic honeycomb body was subjected to the finishing step in a state where the optimum chuck angle was fixed by the first fixture and the second fixture. Therefore, in Examples 3 to 5, it was possible to manufacture the ceramic honeycomb structure having a large diametrical dimension with a high yield. Moreover, also in Examples 6 to 8 in which the contour was measured via the spacers 66 in a state where the temperature of the dried ceramic honeycomb body was 120° C., it was possible to manufacture the honeycomb structure with the high yield in the same manner as in Examples 3 to 5. Furthermore, as shown in Table 3, it is seen that even when a type of a raw material to prepare the dried ceramic honeycomb body changes, the process capability index of the perpendicularity is high according to the manufacturing methods of Examples 9 and 10 as compared with the manufacturing methods of Comparative Examples 6 and 7.

A manufacturing method of a ceramic honeycomb structure of the present invention can be utilized in a method of manufacturing the ceramic honeycomb structure having an excellent perpendicularity.

DESCRIPTION OF REFERENCE MARKS

50: dried ceramic honeycomb body, 50a and 50b: surplus portion, 51: partition wall, 52: cell, 61: one end surface, 62: the other end surface, 63: outer wall, 65: measurement table, 66: spacer, 67: laser displacement meter, 68a: first fixture, 68b: second fixture, 69: auxiliary fixture, 70: finished dried ceramic honeycomb body, 75a and 75b: cutting tool, 80: rotating direction, 100 and 200: ceramic honeycomb structure, 111: one end surface, 111a: point (one point of a peripheral edge of the one end surface), 112: the other end surface, 112a: end point (the end point of a peripheral edge of the other end surface), 115: virtual line, 116: virtual plane, 118: intersection, A: finishing step, B: firing step, C1x, C1y, C2x and C2y: contour, f: clearance, k1: solid line, k2: broken line, L: direction from one end surface to the other end surface, m: finished dimension, n1: distance (the distance from the cutting tool to a first fix position), n2: distance (the distance from the cutting tool to a third fix position), P1 and P2: contour measurement start point, C1yny: first fix position, C1xnx: second fix position, C2yny: third fix position, C2xnx: fourth fix position, P1x: first measurement point, P1y: second measurement point, P2x: third measurement point, 22y: fourth measurement point, R: circumferential direction, Q1: first measuring portion, Q2: second measuring portion, and Y1: length (perpendicularity).

What is claimed is:

1. A manufacturing method of a ceramic honeycomb structure comprising:
a finishing step of finishing one end surface and another end surface of a cylindrical dried ceramic honeycomb body having the one end surface and the other end surface, to obtain a finished dried ceramic honeycomb body; and
a firing step of firing the finished dried ceramic honeycomb body, to obtain the ceramic honeycomb structure,
wherein in the finishing step, two positions away from each other in a direction from the one end surface toward the other end surface of a peripheral surface of the dried ceramic honeycomb body are a contour measurement start point P1 and a contour measurement start point P2;
in a first measuring portion Q disposed around a periphery in a circumferential direction including the contour measurement start point P1, a contour of a diametrical dimension of the dried ceramic honeycomb body is measured at a plurality of measurement points while shifting a measurement position from the contour measurement start point P1 in the circumferential direction;
in a second measuring portion Q2 disposed around the periphery in a circumferential direction including the contour measurement start point P2, the contour of the diametrical dimension of the dried ceramic honeycomb body is measured at a plurality of measurement points while shifting a measurement position from the contour measurement start point P2 in the circumferential direction;

the contour measured at a first measurement point P1x of the first measuring portion Q1 is a contour C1x, the contour measured at a second measurement point P1y present at a position shifted by a predetermined phase from the first measurement point P1x of the first measuring portion Q1 is a contour C1y, the contour measured at a third measurement point P2x of the second measuring portion Q2 which is present at a position of the same phase as the first measurement point P1x is a contour C2x, and the contour measured at a fourth measurement point P2y of the second measuring portion Q2 which is present at a position of the same phase as the second measurement point P1y is a contour C2y;

a total of absolute values of differences between respective values of the four contours C1x, C1y, C2x and C2y is obtained for every measurement point; and the one end surface and the other end surface of the dried ceramic honeycomb body are subjected to the finishing step in a state where the four measurement points where the total of the absolute values of the differences between the respective values of the contours C1x, C1y, C2x, and C2y of the peripheral surface of the dried ceramic honeycomb body is minimum are fixed by a first fixture and a second fixture.

2. The manufacturing method of the ceramic honeycomb structure according to claim 1,
wherein the total of the absolute values of the differences between the respective values of the contours C1x, C1y, C2x and C2y is calculated in accordance with the following equation (1):

[Equation 1]

$$|C1x-C2x|+|C1y-C2y|+|C1x-C1y|+|C2x-C2y| \quad (1).$$

3. The manufacturing method of the ceramic honeycomb structure according to claim 2,
wherein when a phase between the contour measurement start point P1 and the second measurement point P1y in the four measurement points where the total of the absolute values of the differences between the respective values of the contours C1x, C1y, C2x, and C2y is minimum is set to an optimum chuck angle, the dried ceramic honeycomb body is rotated by the optimum chuck angle prior to fixing the dried ceramic honeycomb body by the first fixture and the second fixture.

4. The manufacturing method of the ceramic honeycomb structure according to claim 3,
wherein the first measurement point P1x and the second measurement point P1y are positions shifted by 60 to 120° in the circumferential direction.

5. The manufacturing method of the ceramic honeycomb structure according to claim 2,
wherein the first measurement point P1x and the second measurement point P1y are positions shifted by 60 to 120° in the circumferential direction.

6. The manufacturing method of the ceramic honeycomb structure according to claim 1,
wherein when a phase between the contour measurement start point P1 and the second measurement point P1y in the four measurement points where the total of the absolute values of the differences between the respective values of the contours C1x, C1y, C2x, and C2y is minimum is set to an optimum chuck angle, the dried ceramic honeycomb body is rotated by the optimum chuck angle prior to fixing the dried ceramic honeycomb body by the first fixture and the second fixture.

7. The manufacturing method of the ceramic honeycomb structure according to claim 6,
wherein the first measurement point P1x and the second measurement point P1y are positions shifted by 60 to 120° in the circumferential direction.

8. The manufacturing method of the ceramic honeycomb structure according to claim 1,
wherein the first measurement point P1x and the second measurement point P1y are positions shifted by 60 to 120° in the circumferential direction.

9. The manufacturing method of the ceramic honeycomb structure according to claim 1,
wherein the dried ceramic honeycomb body is mounted on a measurement table so that the one end surface becomes a bottom surface, to measure the contour.

10. The manufacturing method of the ceramic honeycomb structure according to claim 9,
wherein when a phase between the contour measurement start point P1 and the second measurement point P1y in the four measurement points where the total of the absolute values of the differences between the respective values of the contours C1x, C1y, C2x, and C2y is minimum is set to an optimum chuck angle, the measurement table is rotated by the optimum chuck angle prior to fixing the dried ceramic honeycomb body by the first fixture and the second fixture.

11. The manufacturing method of the ceramic honeycomb structure according to claim 9,
wherein spacers are arranged in at least three portions between the dried ceramic honeycomb body and the measurement table.

12. The manufacturing method of the ceramic honeycomb structure according to claim 9,
wherein when the dried ceramic honeycomb body is mounted on the measurement table, a height difference of a tilt of the bottom surface of the dried ceramic honeycomb body to a horizontal plane is 4 mm or less.

13. The manufacturing method of the ceramic honeycomb structure according to claim 1,
wherein a temperature of the dried ceramic honeycomb body is from 20 to 150° C.

14. The manufacturing method of the ceramic honeycomb structure according to claim 1,
wherein the contour is measured by a reflective type non-contact laser displacement meter.

15. The manufacturing method of the ceramic honeycomb structure according to claim 1,
wherein the dried ceramic honeycomb body has a concave and/or convex surface on an outer periphery.

16. The manufacturing method of the ceramic honeycomb structure according to claim 1,
wherein a one-side tolerance of a diameter of the dried ceramic honeycomb body is larger than a perpendicularity.

17. The manufacturing method of the ceramic honeycomb structure according to claim 1,
wherein the diameter of the dried ceramic honeycomb body is 100 mm or more.

18. The manufacturing method of the ceramic honeycomb structure according to claim 1,
wherein the dried ceramic honeycomb body is made of a forming raw material including at least one selected from the group consisting of cordierite, silicon carbide, and alumina.

19. The manufacturing method of the ceramic honeycomb structure according to claim 1, further comprising a plugged portion preparing step of filling a plugging material into cells of the finished dried ceramic honeycomb body or the ceramic honeycomb structure.

* * * * *